US012126435B2

(12) United States Patent
Akl et al.

(10) Patent No.: US 12,126,435 B2
(45) Date of Patent: Oct. 22, 2024

(54) INTEGRATED ACCESS AND BACKHAUL NODE TO REPEATER CONVERSION

(71) Applicant: QUALCOMM Incorporated, San Diego, CA (US)

(72) Inventors: Naeem Akl, Somerville, NJ (US); Navid Abedini, Basking Ridge, NJ (US); Jianghong Luo, Skillman, NJ (US); Karl Georg Hampel, Hoboken, NJ (US); Junyi Li, Fairless Hills, PA (US); Tao Luo, San Diego, CA (US)

(*) Notice: Subject to any disclaimer, the term of this patent is extended or adjusted under 35 U.S.C. 154(b) by 347 days.

(21) Appl. No.: 17/572,098

(22) Filed: Jan. 10, 2022

(65) Prior Publication Data

US 2023/0224072 A1 Jul. 13, 2023

(51) Int. Cl.
*H04W 88/14* (2009.01)
*H04L 1/00* (2006.01)
*H04W 52/36* (2009.01)

(52) U.S. Cl.
CPC ......... *H04L 1/0025* (2013.01); *H04W 52/367* (2013.01); *H04W 88/14* (2013.01)

(58) Field of Classification Search
CPC .. H04L 1/0025; H04W 52/367; H04W 88/14; H04W 28/0215; H04W 40/22; H04W 52/0206; H04B 7/15557
See application file for complete search history.

(56) References Cited

U.S. PATENT DOCUMENTS

| | | | | |
|---|---|---|---|---|
| 10,178,594 | B1* | 1/2019 | Liu | H04B 7/15507 |
| 2008/0008132 | A1* | 1/2008 | Ushiki | H04W 88/06 |
| | | | | 370/331 |
| 2008/0165721 | A1* | 7/2008 | Fujii | H04L 1/1858 |
| | | | | 370/315 |
| 2009/0213760 | A1* | 8/2009 | Shin | H04W 74/002 |
| | | | | 370/254 |
| 2011/0273999 | A1* | 11/2011 | Nagaraja | H04L 1/1692 |
| | | | | 370/252 |
| 2012/0106437 | A1* | 5/2012 | Seo | H04W 72/535 |
| | | | | 370/315 |
| 2019/0319756 | A1* | 10/2019 | Moshfeghi | H04B 7/043 |

(Continued)

FOREIGN PATENT DOCUMENTS

WO WO-2012064251 A1 5/2012
WO WO-2019216717 A1 11/2019

OTHER PUBLICATIONS

International Search Report and Written Opinion—PCT/US2022/053605—ISA/EPO—Apr. 17, 2023 (2107689WO).

*Primary Examiner* — Sithu Ko
*Assistant Examiner* — Malick A Sohrab

(57) ABSTRACT

Methods, systems, and devices for wireless communication are described. A wireless device may transmit first control signaling indicating a capability of the wireless device to operate in a plurality of modes of operation. The plurality of modes of operation including a first mode of operation associated with repeater operations and a first energy level and a second mode of operation associated with integrated access and backhaul (IAB) operations and a second energy level higher than the first energy level. The wireless device may receive second control signaling indicating at least one mode of operation of the plurality of modes of operation, and communicate one or more wireless signals according to the at least one mode of operation at the wireless device.

30 Claims, 12 Drawing Sheets

(56) References Cited

U.S. PATENT DOCUMENTS

| | | | |
|---|---|---|---|
| 2020/0052775 A1* | 2/2020 | Nam | H04L 5/14 |
| 2020/0053655 A1* | 2/2020 | Ghosh | H04W 88/10 |
| 2023/0035989 A1* | 2/2023 | Awadin | H04W 72/569 |

* cited by examiner

INTEGRATED ACCESS AND BACKHAUL NODE TO REPEATER CONVERSION

FIELD OF TECHNOLOGY

The following relates to wireless communication, including integrated access and backhaul (IAB) node to repeater conversion.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

Various aspects of the present disclosure relate to enabling a communication device to support managing a mode of operation to increase energy saving at the communication device. The communication device may have a capability to operate in a plurality of modes of operation to support high reliability and low latency wireless communications, as well as reduce power consumption. For example, the communication device may support IAB operations and repeater operations. The communication device may transmit control signaling indicating the capability of the communication device to operate in one or both of an IAB mode of operation or a repeater mode of operation. Additionally, the capability may indicate a first energy level associated with the IAB mode of operation and a second energy level associated with the repeater mode of operation. The communication device may be configured by the network to operate according to at least one mode of operation (e.g., IAB mode of operation, repeater mode of operation) based on the indicated capability of the communication device. As such, the communication device may be configured to effectively and efficiently mange a mode of operation to increase energy saving at the communication device.

A method for wireless communication at a first wireless device is described. The method may include transmitting first control signaling indicating a capability of the first wireless device to operate in a set of multiple modes of operation, the set of multiple modes of operation including a first mode of operation associated with repeater operations and a first energy level and a second mode of operation associated with IAB operations and a second energy level higher than the first energy level, receiving second control signaling indicating at least one mode of operation of the set of multiple modes of operation, and communicating one or more wireless signals according to the at least one mode of operation at the first wireless device.

An apparatus for wireless communication at a first wireless device is described. The apparatus may include a processor, memory coupled with the processor, and instructions stored in the memory. The instructions may be executable by the processor to cause the apparatus to transmit first control signaling indicating a capability of the first wireless device to operate in a set of multiple modes of operation, the set of multiple modes of operation including a first mode of operation associated with repeater operations and a first energy level and a second mode of operation associated with IAB operations and a second energy level higher than the first energy level, receive second control signaling indicating at least one mode of operation of the set of multiple modes of operation, and communicate one or more wireless signals according to the at least one mode of operation at the first wireless device.

Another apparatus for wireless communication at a first wireless device is described. The apparatus may include means for transmitting first control signaling indicating a capability of the first wireless device to operate in a set of multiple modes of operation, the set of multiple modes of operation including a first mode of operation associated with repeater operations and a first energy level and a second mode of operation associated with IAB operations and a second energy level higher than the first energy level, means for receiving second control signaling indicating at least one mode of operation of the set of multiple modes of operation, and means for communicating one or more wireless signals according to the at least one mode of operation at the first wireless device.

A non-transitory computer-readable medium storing code for wireless communication at a first wireless device is described. The code may include instructions executable by a processor to transmit first control signaling indicating a capability of the first wireless device to operate in a set of multiple modes of operation, the set of multiple modes of operation including a first mode of operation associated with repeater operations and a first energy level and a second mode of operation associated with IAB operations and a second energy level higher than the first energy level, receive second control signaling indicating at least one mode of operation of the set of multiple modes of operation, and communicate one or more wireless signals according to the at least one mode of operation at the first wireless device.

In some examples of the method, apparatuses, and non-transitory computer-readable medium described herein, the one or more wireless signals includes backhaul traffic and the method, apparatuses, and non-transitory computer-readable medium may include further operations, features, means, or instructions for communicating the backhaul traffic according to the at least one mode of operation.

In some examples of the method, apparatuses, and non-transitory computer-readable medium described herein, communicating the one or more wireless signals may include operations, features, means, or instructions for receiving, from a second wireless device, the one or more wireless signals according to the at least one mode of operation and transmitting, to a third wireless device, the one or more wireless signals according to the at least one mode of operation, where the one or more wireless signals includes backhaul traffic.

Some examples of the method, apparatuses, and non-transitory computer-readable medium described herein may further include operations, features, means, or instructions for determining a type of device associated with one or both of the second wireless device or the third wireless device, the type of device including a user equipment or an IAB node, selecting the at least one mode of operation of the set of multiple modes of operation based on the type of device associated with one or both of the second wireless device or the third wireless device, and where communicating the one or more wireless signals may be further based on selecting the at least one mode of operation.

Some examples of the method, apparatuses, and non-transitory computer-readable medium described herein may further include operations, features, means, or instructions for determining a communication link between the first wireless device and a second wireless device, selecting the at least one mode of operation of the set of multiple modes of operation based on the communication link between the first wireless device and a second wireless device, and where communicating the one or more wireless signals may be further based on selecting the at least one mode of operation.

Some examples of the method, apparatuses, and non-transitory computer-readable medium described herein may further include operations, features, means, or instructions for determining a type of traffic associated with the one or more wireless signals, selecting the at least one mode of operation of the set of multiple modes of operation based on the type of traffic associated with the one or more wireless signals, and where communicating the one or more wireless signals may be further based on selecting the at least one mode of operation.

In some examples of the method, apparatuses, and non-transitory computer-readable medium described herein, the first mode of operation may be associated with a first resource type and the second mode of operation may be associated with a second resource type different than the first resource type.

Some examples of the method, apparatuses, and non-transitory computer-readable medium described herein may further include operations, features, means, or instructions for determining a set of resources in one or both of a time domain or a frequency domain associated with the one or more wireless signals, selecting the at least one mode of operation of the set of multiple modes of operation based on the set of resources in one or both of the time domain or the frequency domain, and where communicating the one or more wireless signals may be further based on selecting the at least one mode of operation.

Some examples of the method, apparatuses, and non-transitory computer-readable medium described herein may further include operations, features, means, or instructions for determining a channel associated with the one or more wireless signals, the channel including an uplink channel or a downlink channel, selecting the at least one mode of operation of the set of multiple modes of operation based on the channel associated with the one or more wireless signals, and where communicating the one or more wireless signals may be further based on selecting the at least one mode of operation.

In some examples of the method, apparatuses, and non-transitory computer-readable medium described herein, the first mode of operation may be associated with a first beam direction for communicating the one or more wireless signals and the second mode of operation may be associated with a second beam direction for communicating the one or more wireless signals and the first beam direction may be different than the second beam direction.

Some examples of the method, apparatuses, and non-transitory computer-readable medium described herein may further include operations, features, means, or instructions for selecting the at least one mode of operation of the set of multiple modes of operation based on timing information indicated by the second control signaling, the timing information identifying a periodic or aperiodic pattern and where communicating the one or more wireless signals may be further based on selecting the at least one mode of operation.

Some examples of the method, apparatuses, and non-transitory computer-readable medium described herein may further include operations, features, means, or instructions for selecting the at least one mode of operation of the set of multiple modes of operation based on a condition indicated by the second control signaling, the condition including a connection establishment or a connection release and where communicating the one or more wireless signals may be further based on selecting the at least one mode of operation.

Some examples of the method, apparatuses, and non-transitory computer-readable medium described herein may further include operations, features, means, or instructions for determining a change to a cell identifier indicated by the second control signaling, selecting the at least one mode of operation of the set of multiple modes of operation based on the change to the cell identifier, and where communicating the one or more wireless signals may be further based on selecting the at least one mode of operation.

In some examples of the method, apparatuses, and non-transitory computer-readable medium described herein, the one or more wireless signals includes one or more synchronization signal blocks (SSBs) and the method, apparatuses, and non-transitory computer-readable medium may include further operations, features, means, or instructions for generating the one or more SSBs when operating in the first mode of operation associated with repeater operations and the first energy level.

In some examples of the method, apparatuses, and non-transitory computer-readable medium described herein, the one or more wireless signals includes one or more SSBs and the method, apparatuses, and non-transitory computer-readable medium may include further operations, features, means, or instructions for receiving, from a second wireless device, the one or more SSBs when operating in the second mode of operation associated with IAB operations and the second energy level and transmitting, to a third wireless device, the one or more SSBs when operating in the second mode of operation associated with IAB operations and the second energy level.

A method for wireless communication at a first wireless device is described. The method may include receiving first control signaling indicating a capability of a second wireless device to operate in a set of multiple modes of operation, the set of multiple modes of operation including a first mode of operation associated with repeater operations and a first energy level and a second mode of operation associated with IAB operations and a second energy level higher than the first energy level, transmitting, to the second wireless device, second control signaling indicating at least one mode of operation of the set of multiple modes of operation, and communicating one or more wireless signals according to the at least one mode of operation indicated by the second control signaling.

An apparatus for wireless communication at a first wireless device is described. The apparatus may include a processor, memory coupled with the processor, and instructions stored in the memory. The instructions may be executable by the processor to cause the apparatus to receive first control signaling indicating a capability of a second wireless device to operate in a set of multiple modes of operation, the set of multiple modes of operation including a first mode of operation associated with repeater operations and a first energy level and a second mode of operation associated with IAB operations and a second energy level higher than the first energy level, transmit, to the second wireless device, second control signaling indicating at least one mode of operation of the set of multiple modes of operation, and communicate one or more wireless signals according to the at least one mode of operation indicated by the second control signaling.

Another apparatus for wireless communication at a first wireless device is described. The apparatus may include means for receiving first control signaling indicating a capability of a second wireless device to operate in a set of multiple modes of operation, the set of multiple modes of operation including a first mode of operation associated with repeater operations and a first energy level and a second mode of operation associated with IAB operations and a second energy level higher than the first energy level, means for transmitting, to the second wireless device, second control signaling indicating at least one mode of operation of the set of multiple modes of operation, and means for communicating one or more wireless signals according to the at least one mode of operation indicated by the second control signaling.

A non-transitory computer-readable medium storing code for wireless communication at a first wireless device is described. The code may include instructions executable by a processor to receive first control signaling indicating a capability of a second wireless device to operate in a set of multiple modes of operation, the set of multiple modes of operation including a first mode of operation associated with repeater operations and a first energy level and a second mode of operation associated with IAB operations and a second energy level higher than the first energy level, transmit, to the second wireless device, second control signaling indicating at least one mode of operation of the set of multiple modes of operation, and communicate one or more wireless signals according to the at least one mode of operation indicated by the second control signaling.

In some examples of the method, apparatuses, and non-transitory computer-readable medium described herein, the one or more wireless signals includes backhaul traffic and the method, apparatuses, and non-transitory computer-readable medium may include further operations, features, means, or instructions for receiving the backhaul traffic according to the at least one mode of operation indicated by the second control signaling.

In some examples of the method, apparatuses, and non-transitory computer-readable medium described herein, communicating the one or more wireless signals may include operations, features, means, or instructions for transmitting, to the second wireless device, the one or more wireless signals according to the at least one mode of operation indicated by the second control signaling.

In some examples of the method, apparatuses, and non-transitory computer-readable medium described herein, the at least one mode of operation indicated by the second control signaling may be based on a communication link between the first wireless device and the second wireless device.

In some examples of the method, apparatuses, and non-transitory computer-readable medium described herein, the at least one mode of operation indicated by the second control signaling may be based on a type of traffic associated with the one or more wireless signals.

In some examples of the method, apparatuses, and non-transitory computer-readable medium described herein, the first mode of operation may be associated with a first resource type and the second mode of operation may be associated with a second resource type different than the first resource type.

In some examples of the method, apparatuses, and non-transitory computer-readable medium described herein, the at least one mode of operation indicated by the second control signaling may be based on a set of resources in one or both of a time domain or a frequency domain associated with the one or more wireless signals.

In some examples of the method, apparatuses, and non-transitory computer-readable medium described herein, the at least one mode of operation indicated by the second control signaling may be based on a channel associated with the one or more wireless signals, the channel including an uplink channel or a downlink channel.

In some examples of the method, apparatuses, and non-transitory computer-readable medium described herein, the first mode of operation may be associated with a first beam direction for communicating the one or more wireless signals and the second mode of operation may be associated with a second beam direction for communicating the one or more wireless signals and the first beam direction may be different than the second beam direction.

In some examples of the method, apparatuses, and non-transitory computer-readable medium described herein, the at least one mode of operation indicated by the second control signaling may be based on a condition and the condition includes a connection establishment or a connection release.

In some examples of the method, apparatuses, and non-transitory computer-readable medium described herein, the one or more wireless signals includes one or more SSBs and the method, apparatuses, and non-transitory computer-readable medium may include further operations, features, means, or instructions for transmitting, to the second wireless device, the one or more SSBs according to the at least one mode of operation indicated by the second control signaling.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/ purchasing devices, medical devices, artificial intelligence (AI)-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, radio frequency (RF)-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

DETAILED DESCRIPTION

A wireless communications system may include communication devices that may support multiple radio access technologies. Examples of radio access technologies include 4G systems, such as LTE systems, and 5G systems, which may be referred to as NR systems. In some cases, a communication device may support IAB operations and may be referred to as an IAB node. The IAB node may receive packets from one communication device (e.g., an IAB mobile terminal (MT)), and relay the received packets to another communication device (e.g., an IAB distributed unit (DU)). Prior to relaying the received packets to the other communication device (e.g., the IAB-DU), the IAB node may decode and re-encode the packets. In some other cases, a communication device may support repeater operations and may be referred to as a repeater node. The repeater node may amplify-and-forward packets without other processing operations, such as encoding and decoding of the packets.

A communication device may support both IAB operations and repeater operations. In some cases, managing a mode of operation for the communication device (e.g., IAB-to-repeater conversion or repeater-to-IAB conversion) may be unsatisfactory. Various aspects of the present disclosure relate to enabling the communication device to support efficiently managing a mode of operation for the communication device to increase energy saving at the communication device. The communication device may transmit to the network an indication of a capability to operate in a plurality of modes of operation, which may include a first mode of operation associated with repeater operations and a second mode of operation associated with IAB operations.

The first mode of operation may be associated with a first energy level, while the second mode of operation may be associated with a second energy level that is higher than the first energy level. The second energy level may be higher because of the additional processing (e.g., decoding and encoding of packets) associated with the IAB operations. The communication device may be configured by the network to select the mode of operation (e.g., IAB operation, repeater operation) based on a criterion. Examples of a criterion may include different types of devices (e.g., UEs vs. IAB-nodes), different types of signals, different types of resources, different types of beam directions, among other examples. As such, the communication device may be configured to effectively and efficiently mange a mode of operation to increase energy saving at the communication device.

Aspects of the disclosure are initially described in the context of wireless communications systems. Aspects of the disclosure are further illustrated by and described with reference to apparatus diagrams, system diagrams, and flowcharts that relate to IAB node to repeater conversion.

Figure 1:
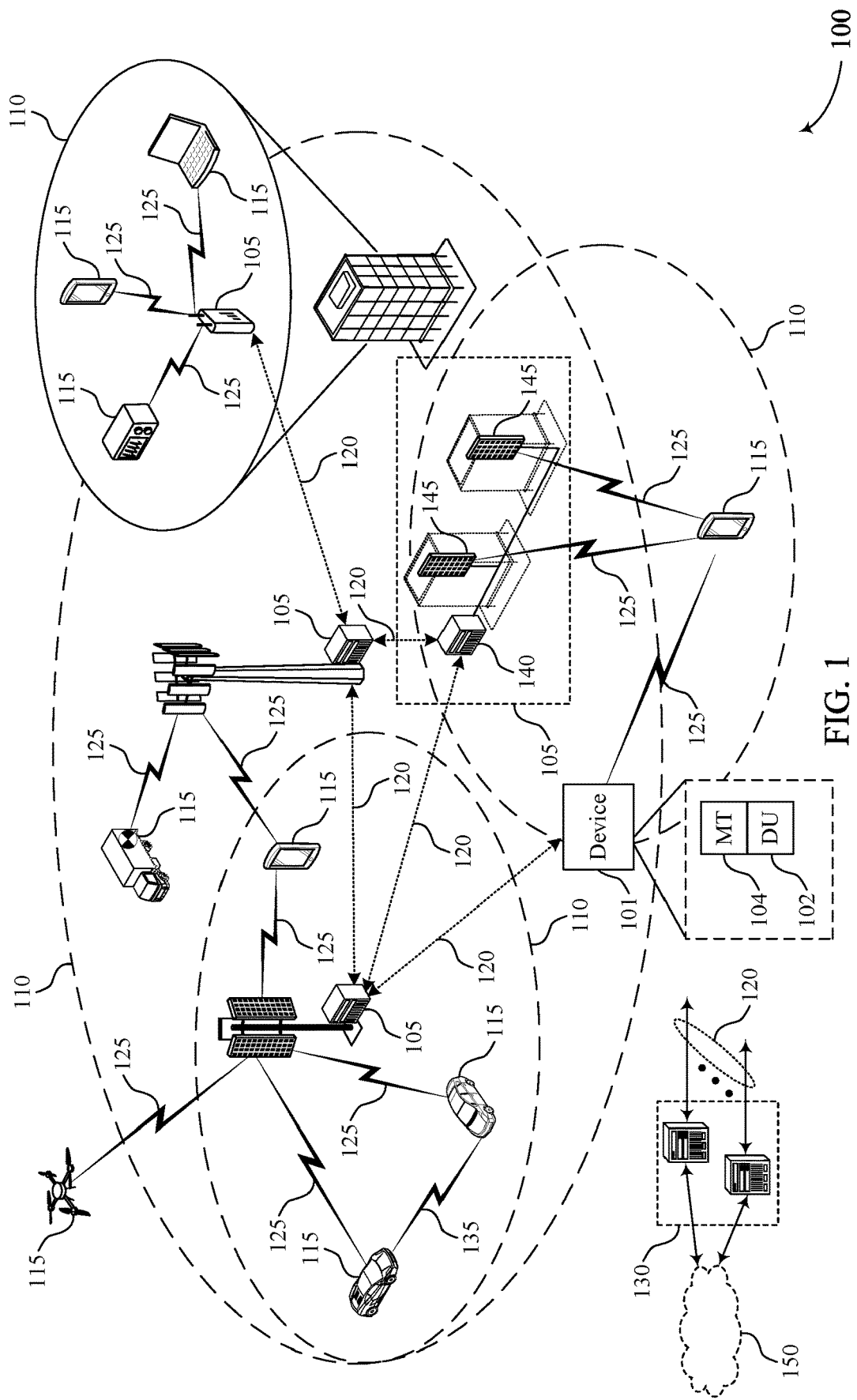
FIGS. 1 through 3 illustrate examples of wireless communications systems that support IAB node to repeater conversion in accordance with aspects of the present disclosure.

FIG. 1 illustrates an example of a wireless communications system 100 that supports IAB node to repeater conversion in accordance with aspects of the present disclosure. The wireless communications system 100 may include one or more base stations 105, one or more UEs 115, and a core network 130. In some examples, the wireless communications system 100 may be an LTE network, an LTE-A network, an LTE-A Pro network, or an NR network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, IAB nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links. One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples. The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology). The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s = 1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORE-SET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

The wireless communications system 100 may include network equipment, such as core network nodes, relay devices, IAB nodes, or other network equipment. An IAB node 101 may include a DU component 102 and an MT component 104. The DU component 102 of the IAB node 101 may be configured to operate as a scheduling entity to schedule scheduled entities (e.g., other IAB nodes and UEs 115) of the IAB node 101. The DU component 102 of the IAB node 101 may operate as a scheduling entity to schedule other IAB nodes and UEs 115. The DU component 102 of the IAB node 101 may schedule communication with other IAB nodes via respective backhaul links 120 and schedule communication with UEs 115 via respective communication links 125 (e.g., access links).

In some cases, the IAB node 101 may be based on a Layer 2 (L2) configuration. The IAB node 101 may support one or more layers of a protocol stack. For example, the IAB node 101 may support wireless communications over a PDCP layer (e.g., end-to-end PDCP layer signaling from a donor IAB node to a UE) for control plane and user plane signaling. The MT component 104 of the IAB node 101 may be configured to operate as a L2 relay node. For example, the MT component 104 of the IAB node 101 may be configured to operate as a scheduled entity that may be scheduled by other IAB donor node. The MT component 104 of the IAB node 101 may also facilitate communication with other IAB donor nodes via respective backhaul links 120.

In some cases, when the IAB node 101 operates as a relay node, packets traversing backhaul links 120 may be decoded and re-encoded for transmission on the communication links 125 (e.g., access links). In some cases, for IAB operations wireless communications over access links (e.g., communications links 125) and backhaul links 120 may be half duplexed. In some other cases, for IAB operations wireless communications over access links (e.g., communications links 125) and backhaul links 120 may be full duplexed.

In some other cases, relay devices may support repeater operations and may be referred to as a repeater node. The relay devices may amplify-and-forward packets without other processing operations, such as encoding and decoding of the packets. Additionally, the relay devices may refrain from adaptive beamforming towards other devices (e.g., base stations 105, UEs 115). In some cases, the relay devices may amplify-and-forward packets based on power characteristics and radio frequency spectrum that the relay devices may be configured to amplify (e.g., single band, multi-band). The relay devices may also support a full duplex mode and may relay wireless communications (e.g., packets) in both directions (e.g., downlink and uplink). As such, the relay devices may support low latency of wireless communication and may improve network coverage in the wireless communications system 100.

A communication device may support both IAB operations and repeater operations. In some cases, managing a mode of operation for the communication device (e.g., IAB-to-repeater conversion or repeater-to-IAB conversion) may be unsatisfactory. Various aspects of the present disclosure relate to enabling the communication device to support efficiently managing a mode of operation for the communication device to increase energy saving at the communication device. The communication device may transmit to the network an indication of a capability to operate in a plurality of modes of operation, which may include a first mode of operation associated with repeater operations and a second mode of operation associated with IAB operations.

In the wireless communications system 100, a communication device (e.g., network equipment, such as core network nodes, relay devices, IAB nodes, or other network equipment) may support managing a mode of operation to increase energy saving at the communication device. The communication device may have a capability to operate in a plurality of modes of operation to support high reliability and low latency wireless communications, as well as reduce power consumption by operating in at least one mode of the plurality of modes of operation. For example, the communication device may support IAB operations and repeater operations. The communication device may transmit control signaling indicating the capability of the communication device to operate in a plurality of modes of operation. Additionally, the capability may indicate a first energy level associated with the repeater operations and a second energy level associated with the IAB operations. The communication device may be configured by the network to operate according to at least one mode of operation (e.g., IAB operation, repeater operation) based on the indicated capability of the communication device. As such, the communication device may be configured to effectively and efficiently mange a mode of operation to increase energy saving at the communication device.

Figure 2:
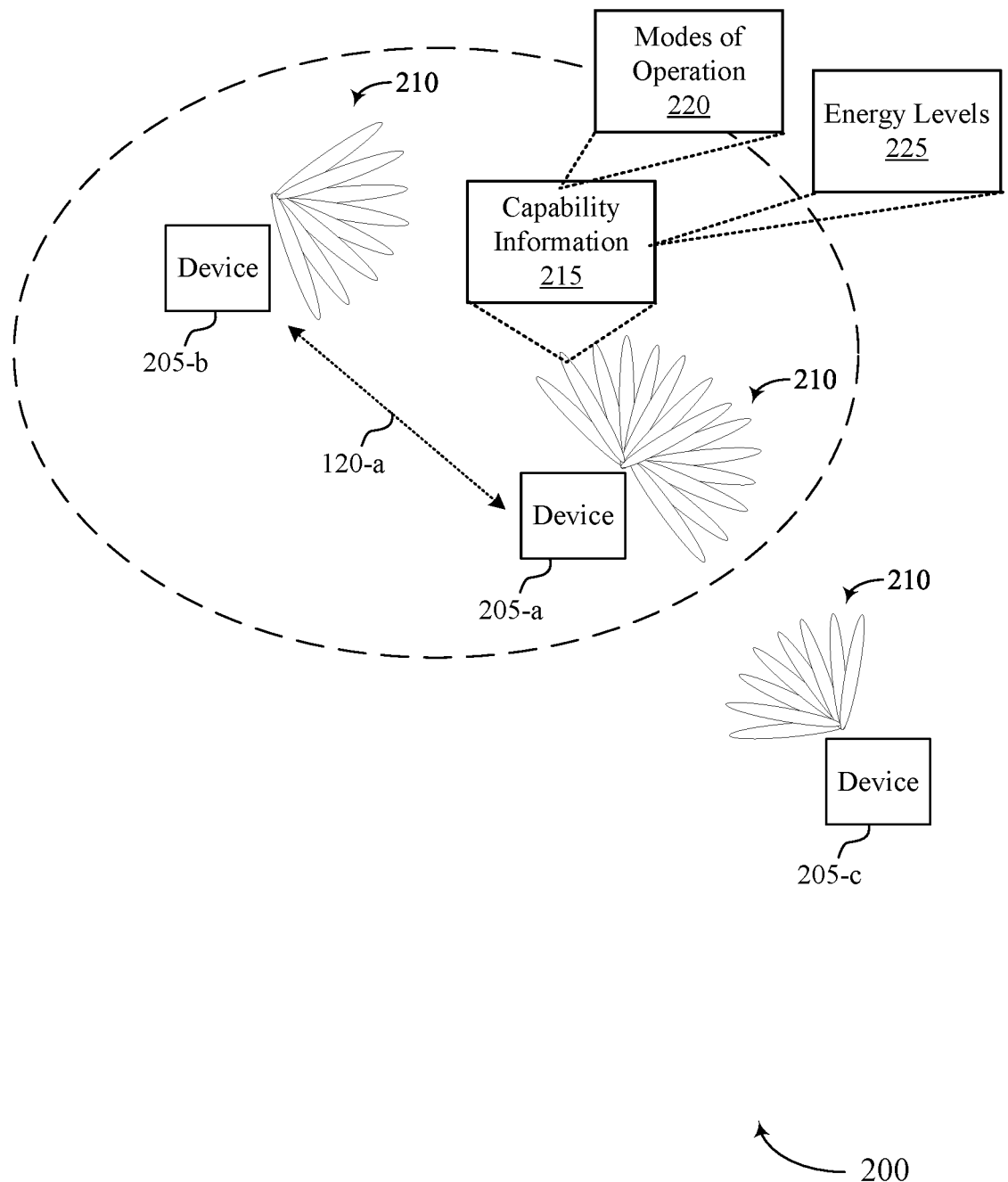

FIG. 2 illustrates an example of a wireless communications system 200 that supports IAB node to repeater conversion in accordance with aspects of the present disclosure. The wireless communications system 200 may implement aspects of the wireless communications system 100 or may be implemented by aspects of the wireless communications systems 100 as described with reference to FIG. 1. The wireless communications system 200 may include a wireless device 205-a, a wireless device 205-b, and a wireless device 205-c which may be examples of corresponding devices as described with reference to FIG. 1. For example, one or more of the wireless devices 205 may include base stations, UEs, or network equipment, such as core network nodes, relay devices, IAB nodes, or other network equipment as described with reference to FIG. 1.

One or more of the wireless device 205-a, the wireless device 205-b, or the wireless device 205-c may be configured with multiple antennas, which may be used to employ techniques such as beamforming 210. The antennas of one or more of the wireless device 205-a, the wireless device 205-b, or the wireless device 205-c may be located within one or more antenna arrays or antenna panels, which may support multiple-input multiple-output operations or transmit or receive beamformed communications. One or more of the wireless device 205-a, the wireless device 205-b, or the wireless device 205-c may have an antenna array with a number of rows and columns of antenna ports that one or more of the wireless device 205-a, the wireless device 205-b, or the wireless device 205-c may use to support various beamforming.

The wireless device 205-a may support a plurality of modes of operation. For example, the wireless device 205-a may support a repeater mode of operation (e.g., a first mode of operation) associated with repeater operations, and an IAB mode of operation (e.g., a second mode of operation) associated with IAB operations. In some cases, the wireless device 205-a may select a mode of operation to reduce power consumption at the wireless device 205-a. For example, the wireless device 205-a may select the repeater mode of operation over the IAB mode of operation for power saving. In some cases, the wireless device 205-a may transmit an indication indicating the selected mode of operation to the network (e.g., the wireless device 205-b) based on switching between the repeater mode of operation and the IAB mode of operation. Additionally or alternatively, the wireless device 205-a may transmit capability information 215 indicating the supported plurality of modes of operation. In some cases, the network (e.g., one or more of a DU or a CU of the wireless device 205-b) may select the mode of operation for the wireless device 205-a.

The network (e.g., one or more of a DU or a CU of the wireless device 205-b) may select a mode of operation for the wireless device 205-a based on a traffic load, a quality of service (QoS), deployment, capabilities of other wireless devices 205 (e.g., nodes) in the wireless communications system 200. In some cases, if a DU of the wireless device 205-b selects the mode of operation for the wireless device 205-a, the wireless device 205-b may indicate the selected mode via semi-static control signaling (e.g., an RRC message) or dynamic controls signaling (e.g., downlink control information (DCI) or medium access control-control element (MAC-CE)). In some other cases, if the CU of the wireless device 205-b selects the mode of operation for the wireless device 205-a, the wireless device 205-b may indicate the selected mode via semi-static control signaling (e.g., an RRC message). In other cases, if a core network (e.g., the wireless device 205-b associated with the core network) selects the mode of operation for the wireless device 205-a, the wireless device 205-b may indicate the selected mode via other control signaling (e.g., a new generation application (NG-AP) signaling).

In the example of FIG. 2, the capability information 215 of the wireless device 205-a may indicate a capability of the wireless device 205-a to operate in a plurality of modes of operation 220, each mode of operation may be associated with a respective energy level of a plurality of energy levels 225. For example, the plurality modes of operation 220 may include a repeater mode of operation (e.g., a first mode of operation) and a first energy level of the energy levels 225, and an IAB mode of operation (e.g., a second mode of operation) associated with IAB operations and a second energy level of the energy levels 225. The second energy level may be higher than the first energy level.

A node may backhaul traffic in a first mode between a first pair of nodes (e.g., a first child node and a first parent node) and in a second mode between a second pair of nodes (e.g., a second child node and a second parent node). The wireless device 205-a may support backhauling traffic between the wireless device 205-b and the wireless device 205-c via a communication link 120-a (e.g., a backhaul link) based on at least one mode of operation from the plurality of modes of operation 220. In some examples, the wireless device 205-a may support concurrently backhauling traffic according to the plurality modes of operation 220. In other words, the wireless device 205-a may support backhauling traffic concurrently in the repeater mode of operation and the IAB mode of operation. For example, the wireless device 205-a may receive, from the wireless device 205-b, one or more wireless signals according to an IAB mode of operation) and transmit, to the wireless device 205-c, one or more wireless signals according to a repeater mode of operation.

In some examples, a node may use different modes of operation for different children nodes (e.g., child UEs vs. child IAB nodes). For example, the wireless device 205-a may determine a type of device associated with one or both of the wireless device 205-b or the wireless device 205-c. The type of device may include a UE or an IAB node. Based on the type of device associated with one or both of the wireless device 205-b or the wireless device 205-c, the wireless device 205-a may select at least one mode of operation of the plurality of modes of operation 220. For example, the wireless device 205-a may select a repeater mode of operation or an IAB mode of operation.

In some other examples, a node may be dual-connected, in which case it may use different modes of operation for traffic or signals associated with different parent node communication links. For example, the wireless device 205-a may determine a communication link, such as an F1 connection between the wireless device 205-a and the wireless device 205-b or the wireless device 205-c. Based on the communication link between the wireless device 205-a and the wireless device 205-b or the wireless device 205-c, the wireless device 205-a may select at least one mode of operation of the plurality of modes of operation 220. For example, the wireless device 205-a may select a repeater mode of operation or an IAB mode of operation.

In other examples, a node may backhaul traffic between a child node and a parent node in a first mode for a first traffic type and in a second mode for a second traffic type. For example, the wireless device 205-a may determine a type of traffic associated with one or more wireless signals for one or both of the wireless device 205-b or the wireless device 205-c. Based on type of traffic associated with the one or more wireless signals, the wireless device 205-a may select at least one mode of operation of the plurality of modes of operation 220. For example, the wireless device 205-a may select a repeater mode of operation or an IAB mode of operation.

In the example of FIG. 2, different modes of operation of the plurality modes of operation 220 may be associated with different types of resources. A resource type may refer to availability of particular resources (e.g., hard (H), soft (S), not available (NA)). Additionally or alternatively, a resource type may be a direction (e.g., downlink or uplink, or both) associated with a resource. The wireless device 205-a may determine a set of resources in one or both of a time domain or a frequency domain associated with one or more wireless signals. Additionally or alternatively, the wireless device 205-a may determine a channel associated with one or more wireless signals. The channel may be an uplink channel or a downlink channel. Examples of an uplink channel includes a physical uplink shared channel (PUSCH) or a physical uplink control channel (PUCCH). Examples of a downlink channel include a physical downlink shared channel PDSCH) or a physical downlink control channel (PDCCH). Based on one or both of the determined set of resources or the determined channel, the wireless device 205-a may select at least one mode of operation of the plurality of modes of operation 220. For example, the wireless device 205-a may select a repeater mode of operation or an IAB mode of operation based on different frequency resources or channels. As such, the wireless device 205-a may use different modes of operation for different frequency resources or channels. In some other examples, the may use different modes of operation based on different beam directions.

The wireless device 205-a may select a mode of operation (e.g., a repeater mode of operation or an IAB mode of operation) based on timing information indicated by the network (e.g., the wireless device 205-b). For example, the network (e.g., the wireless device 205-b) may indicate the mode of operation (e.g., a repeater mode of operation or an IAB mode of operation) for the wireless device 205-a, and timing information for when the wireless device 205-a may transition (e.g., switch) to the indicated mode of operation. The transitioning may follow a predetermined pattern (e.g., semi-static or periodic pattern).

Additionally or alternatively, the network (e.g., the wireless device 205-b) may indicate the mode of operation (e.g., a repeater mode of operation or an IAB mode of operation) for the wireless device 205-a, and a condition for when the wireless device 205-a may transition (e.g., switch) to the indicated mode of operation. For example, the wireless device 205-a may transition between modes of operation based on a link condition of at least one of child link (e.g., between the wireless device 205-a and the wireless device 205-c), a parent link (e.g., between the wireless device 205-a and the wireless device 205-b), or end-to-end communication link between the parent and the child (e.g., between the wireless device 205-b and the wireless device 205-c).

The mode of operation switch of the wireless device 205-a may be based on an establishment or release of a connection between the wireless device 205-a and a central node (e.g., an F1 connection). The plurality of modes of operation 220 may include additional or other modes of operation, such as different repeating operations (e.g., digital repeating or decode and forward operation). The mode of operation may include or be associated with a cell identifier change. In some examples, an indication as described above may include whether the mode of operation transition includes a cell identifier change. The wireless device 205-a may determine a change to a cell identifier indicated by the network (e.g., the wireless device 205-b), and select at least one mode of operation (e.g., a repeater mode of operation or an IAB mode of operation) of the plurality of modes of operation 220 based the cell identifier. In some examples, a transition between modes of operation may include a change for sending SSBs (e.g., one or more of generating, receiving, or forwarding SSBs from the wireless device 205-b), and may be dependent on a backhauling mode of the wireless device 205-b.

Figure 3:
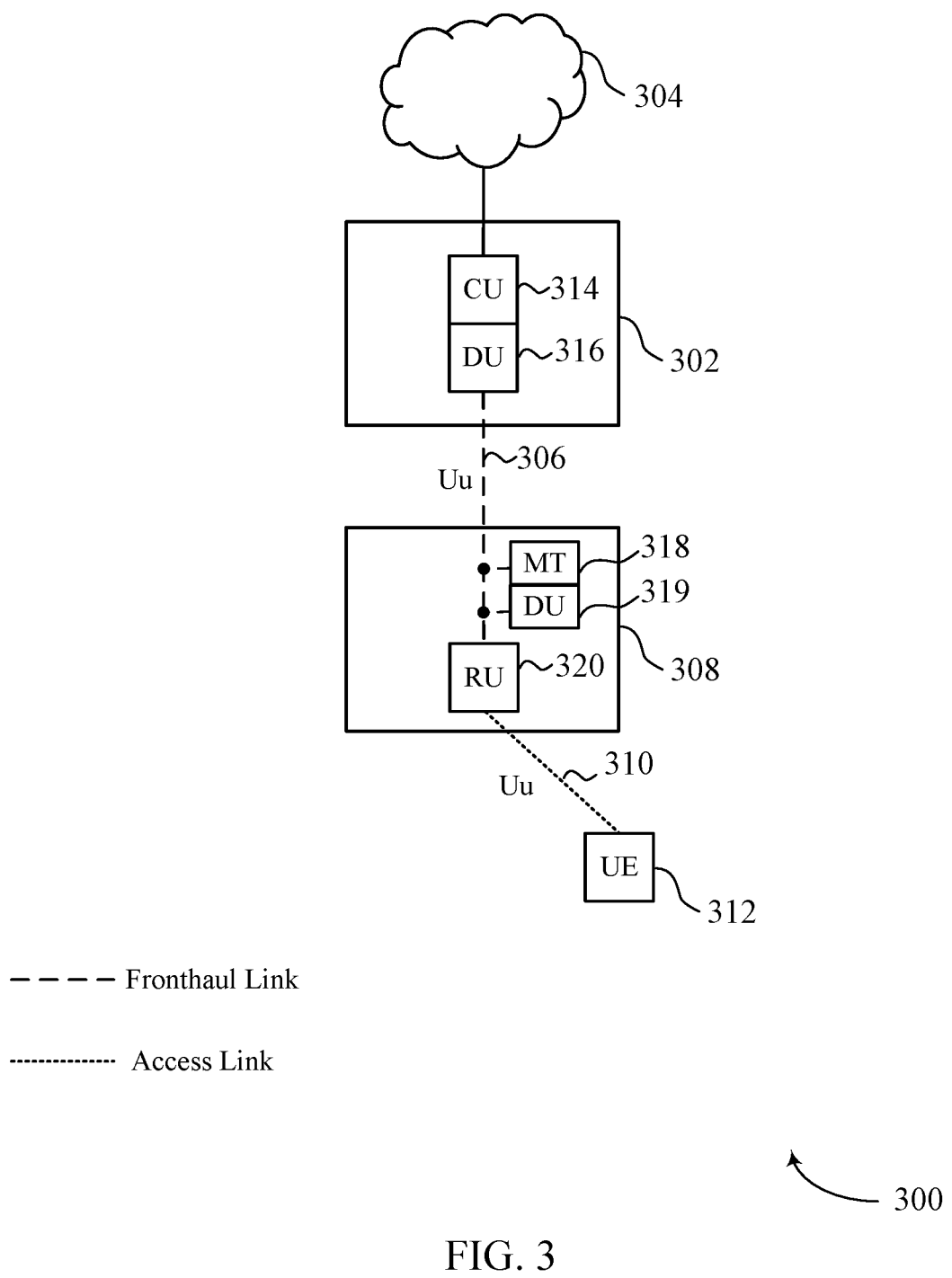

FIG. 3 shows a diagram of a wireless communications system 300 that supports IAB node to repeater conversion in accordance with aspects of the present disclosure. The wireless communications system 300 may implement aspects of the wireless communications system 200 or may be implemented by aspects of the wireless communications systems 200 as described with reference to FIG. 1. For example, the wireless communications system 300 may include a network entity such as a base station 302, which may be coupled to a remote network 304, such as a main backhaul network or mobile core network. In the wireless communications system 300, wireless spectrum may be used for a fronthaul link 306 between the base station 302 and a wireless device 308 and for an access link 310 between the wireless device 308 and a UE 312. The fronthaul link 306 and the access link 310 may each be conducted over a Uu radio interface or some other suitable wireless communication interface. In some examples, the wireless spectrum may utilize mmW frequencies and/or sub-6 GHz carrier frequencies.

In the example of FIG. 3, the base station 302 may be referred to as a donor node since the base station 302 provides a communication link to the remote network 304. A donor node may include, for example, a wired (e.g., fiber, coaxial cable, Ethernet, copper wires), microwave, or other suitable link to the remote network 304. In some examples, the base station 302 may include a CU 314 and a DU 316. The CU 314 may be configured to operate as a centralized network node (or central entity) within the wireless communications system 300. For example, the CU 314 may include radio resource control (RRC) layer functionality and packet data convergence protocol (PDCP) layer functionality to control/configure the other nodes (e.g., repeaters and UEs) within the wireless communications system 300. In some aspects, RRC signaling may be used for various functions including, as one example, setting up and releasing user data bears. In some examples, RRC signaling messages may be transported over signaling radio bearers (e.g., SRB 1 and SRB 2). In some examples, communications between the wireless device 308 and a central node (e.g., the base station 302) may be via an RRC connection or F1 connection. In some examples, communications between the wireless device 308 and a parent node may be via DCI, MAC-CE, or Backhaul Adaptation Protocol (BAP) signaling.

The DU 316 may be configured to operate as a scheduling entity to schedule scheduled entities (e.g., repeaters and/or UEs) of the base station 302. For example, the DU 316 may operate as a scheduling entity to schedule the wireless device 308 and the UE 312. In some examples, the DU 316 may include radio link control (RLC), medium access control (MAC), and physical (PHY) layer functionality to enable operation as a scheduling entity.

An F1 interface provides a mechanism to interconnect the CU 314 (e.g., PDCP layer and higher layers) and the DU 316 (e.g., RLC layer and lower layers). In some aspects, an F1 interface may provide control plane and user plane functions (e.g., interface management, system information management, UE context management, RRC message transfer, etc.). F1AP is an application protocol for F1 that defines signaling procedures for F1 in some examples. The F1 interfaces support F1-C on the control plane and F1-U on the user plane.

To facilitate wireless communication between the base station 302 and the UEs (e.g., the UE 312) served by the base station 302, the wireless device 308 may be configured to operate as a scheduled entity. The wireless device 308 may include a MT 318 to enable scheduled entity functionality. For example, the MT 318 may include UE functionality to connect to the base station 302 and to be scheduled by the base station 302. The wireless device 308 may also include a DU 319, which may include similar functionality as the DU 316. The wireless device 308 also includes a repeating unit (RU) 320 that relays signals between the base station 302 and the UE 312. An RU may also be referred to as a relay unit, a remote unit, and the like.

The repeater operations of the wireless device 308 may support reduced functionality (e.g., no F1 interface), reduced processing (e.g., simplified protocol stack), and lower latency. The IAB operations of the wireless device 308 may support IAB operations for improved signaling quality. As described herein. the wireless device 308 may support efficient IAB-to-repeater conversion for energy saving and latency reduction. Additionally, the wireless device 308 may support improved parent-to-child link, or provision of new cells in the wireless communications system 300.

Figure 4:
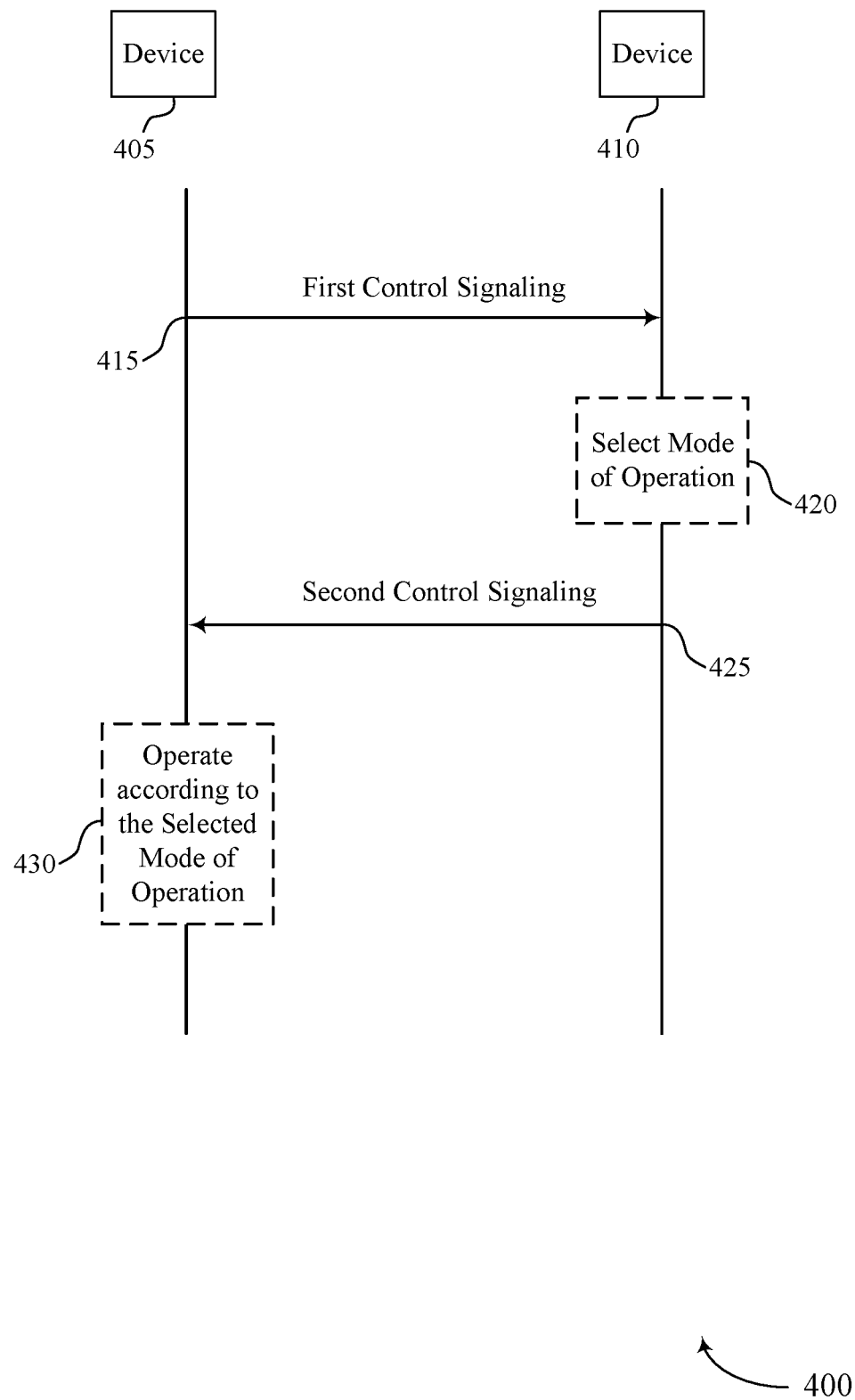
FIG. 4 illustrates an example of a process flow that supports IAB node to repeater conversion in accordance with aspects of the present disclosure.

FIG. 4 illustrates an example of a process flow 400 that supports IAB node to repeater conversion in accordance with aspects of the present disclosure. In some examples, the process flow 400 may implement or be implemented by aspects of the wireless communications system 200. For example, the process flow 400 may include a wireless device 405 and a wireless device 410, which may be examples of the corresponding devices described herein. For example, one or both of the wireless devices 405 or the wireless device 410 may include base stations, UEs, or network equipment, such as core network nodes, relay devices, IAB nodes, or other network equipment as described with reference to FIG. 2.

In the following description of the process flow 400, the operations between the wireless device 405 and the wireless device 410 may be transmitted in a different order than the example order shown, or the operations performed by the wireless device 405 and the wireless device 410 may be performed in different orders or at different times, or the operations performed by a device may additionally or alternatively be performed by another device. Some operations may also be omitted from the process flow 400, and other operations may be added to the process flow 400.

At 415, the wireless device 405 may transmit, and the wireless device 410 may receive, first control signaling indicating a capability of the wireless device 405 to operate in a plurality of modes of operation. The plurality of modes of operation may include a first mode of operation (e.g., a repeater mode of operation) associated with repeater operations and a first energy level and a second mode of operation ((e.g., an IAB mode of operation) associated with IAB operations and a second energy level higher than the first energy level.

At 420, the wireless device 410 may select a mode of operation for the wireless device 405, for example based on the capability of the wireless device 405. The selection may be based on one or more criterions as described herein. At 425, the wireless device 410 may transmit, and the wireless device 405 may receive, second control signaling indicating the selected mode of operation of the plurality of modes of operation. At 430, the wireless device 405 may operate according to the selected mode of operation (e.g., a repeater mode of operation or an IAB mode of operation).

Figure 5:
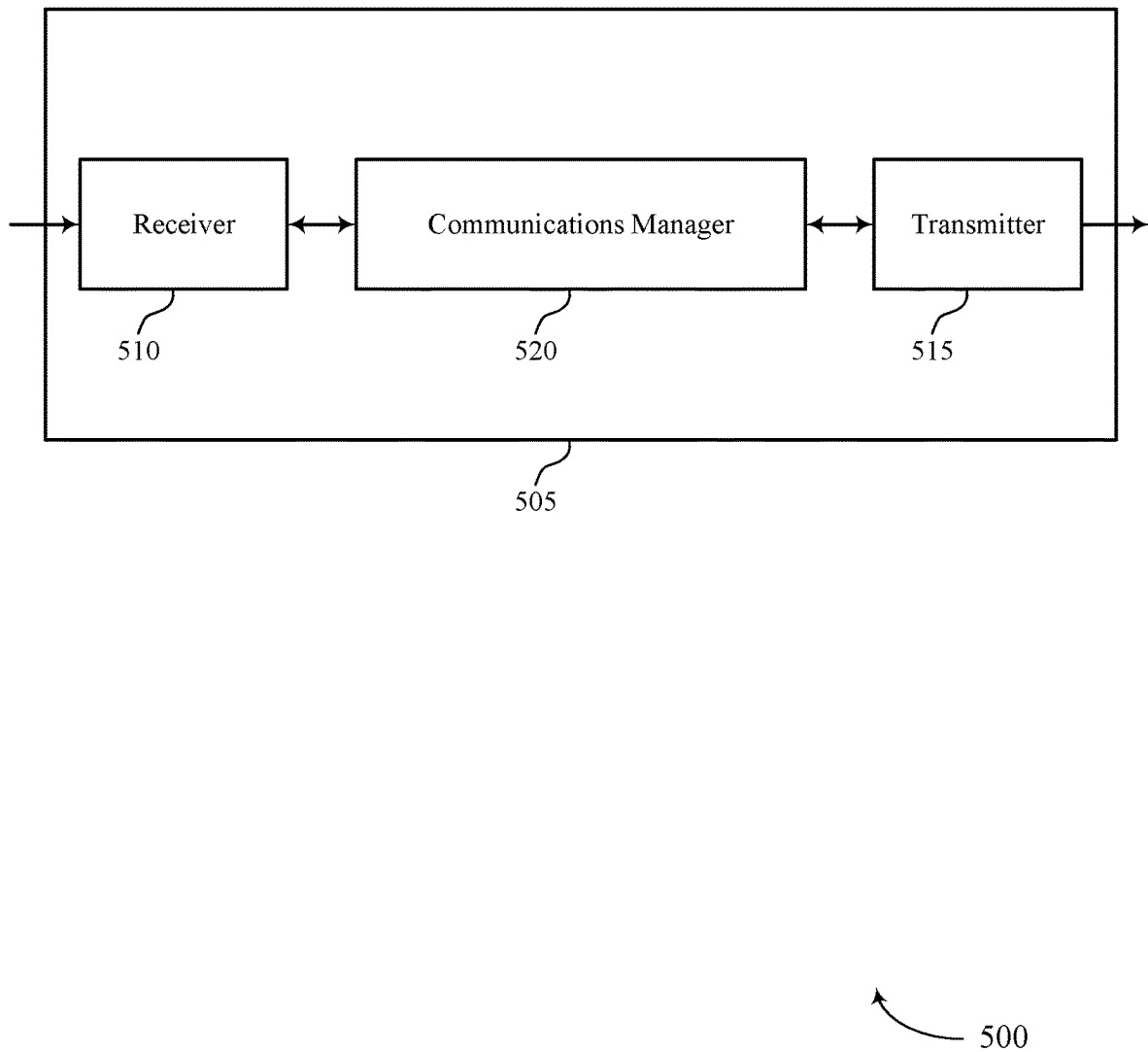
FIGS. 5 and 6 show block diagrams of devices that support IAB node to repeater conversion in accordance with aspects of the present disclosure.

FIG. 5 shows a block diagram 500 of a device 505 that supports IAB node to repeater conversion in accordance with aspects of the present disclosure. The device 505 may be an example of aspects of a network equipment (e.g., core network nodes, relay devices, IAB nodes, or other network equipment) as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to IAB node to repeater conversion). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to IAB node to repeater conversion). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of IAB node to repeater conversion as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communication at a first wireless device (e.g., the device 505) in accordance with examples as disclosed herein. For example, the communications manager 520 may be configured as or otherwise support a means for transmitting first control signaling indicating a capability of the first wireless device to operate in a set of multiple modes of operation, the set of multiple modes of operation including a first mode of operation associated with repeater operations and a first energy level and a second mode of operation associated with IAB operations and a second energy level higher than the first energy level. The communications manager 520 may be configured as or otherwise support a means for receiving second control signaling indicating at least one mode of operation of the set of multiple modes of operation. The communications manager 520 may be configured as or otherwise support a means for communicating one or more wireless signals according to the at least one mode of operation at the first wireless device.

Additionally or alternatively, the communications manager 520 may support wireless communication at a first wireless device (e.g., the device 505) in accordance with examples as disclosed herein. For example, the communications manager 520 may be configured as or otherwise support a means for receiving first control signaling indicating a capability of a second wireless device to operate in a set of multiple modes of operation, the set of multiple modes of operation including a first mode of operation associated with repeater operations and a first energy level and a second mode of operation associated with IAB operations and a second energy level higher than the first energy level. The communications manager 520 may be configured as or otherwise support a means for transmitting, to the second wireless device, second control signaling indicating at least one mode of operation of the set of multiple modes of operation. The communications manager 520 may be configured as or otherwise support a means for communicating one or more wireless signals according to the at least one mode of operation indicated by the second control signaling.

By including or configuring the communications manager 520 in accordance with examples as described herein, the device 505 (e.g., a processor controlling or otherwise coupled to the receiver 510, the transmitter 515, the communications manager 520, or a combination thereof) may support techniques for reduced power consumption.

Figure 6:
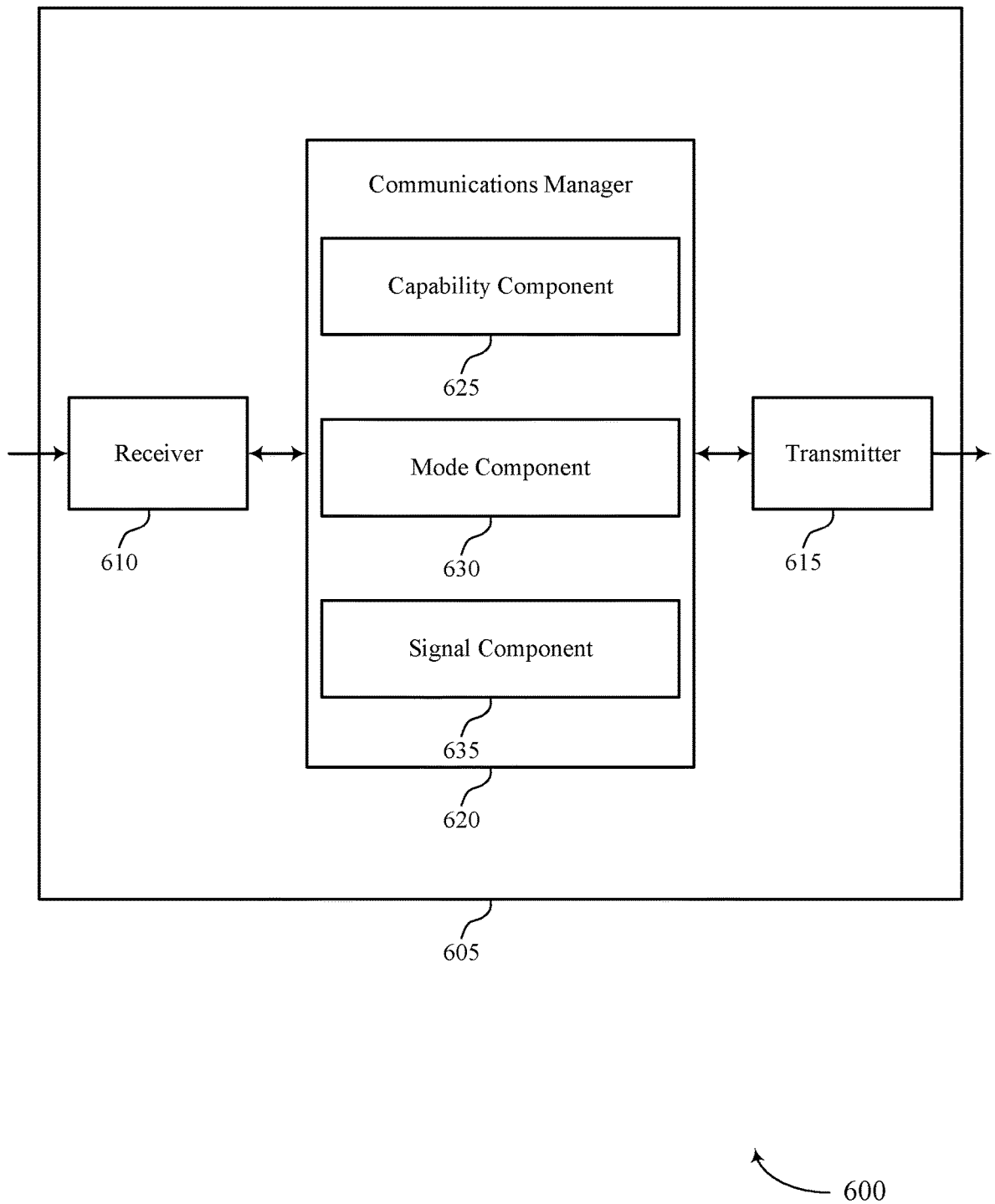

FIG. 6 shows a block diagram 600 of a device 605 that supports IAB node to repeater conversion in accordance with aspects of the present disclosure. The device 605 may be an example of aspects of a device 505, or network equipment (e.g., core network nodes, relay devices, IAB nodes, or other network equipment) as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to IAB node to repeater conversion). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to IAB node to repeater conversion). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of IAB node to repeater conversion as described herein. For example, the communications manager 620 may include a capability component 625, a mode component 630, a signal component 635, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication at a first wireless device (e.g., the device 605) in accordance with examples as disclosed herein. The capability component 625 may be configured as or otherwise support a means for transmitting first control signaling indicating a capability of the first wireless device to operate in a set of multiple modes of operation, the set of multiple modes of operation including a first mode of operation associated with repeater operations and a first energy level and a second mode of operation associated with IAB operations and a second energy level higher than the first energy level. The mode component 630 may be configured as or otherwise support a means for receiving second control signaling indicating at least one mode of operation of the set of multiple modes of operation. The signal component 635 may be configured as or otherwise support a means for communicating one or more wireless signals according to the at least one mode of operation at the first wireless device.

Additionally or alternatively, the communications manager 620 may support wireless communication at a first wireless device (e.g., the device 605) in accordance with examples as disclosed herein. The capability component 625 may be configured as or otherwise support a means for receiving first control signaling indicating a capability of a second wireless device to operate in a set of multiple modes of operation, the set of multiple modes of operation including a first mode of operation associated with repeater operations and a first energy level and a second mode of operation associated with IAB operations and a second energy level higher than the first energy level. The mode component 630 may be configured as or otherwise support a means for transmitting, to the second wireless device, second control signaling indicating at least one mode of operation of the set of multiple modes of operation. The signal component 635 may be configured as or otherwise support a means for communicating one or more wireless signals according to the at least one mode of operation indicated by the second control signaling.

Figure 7:
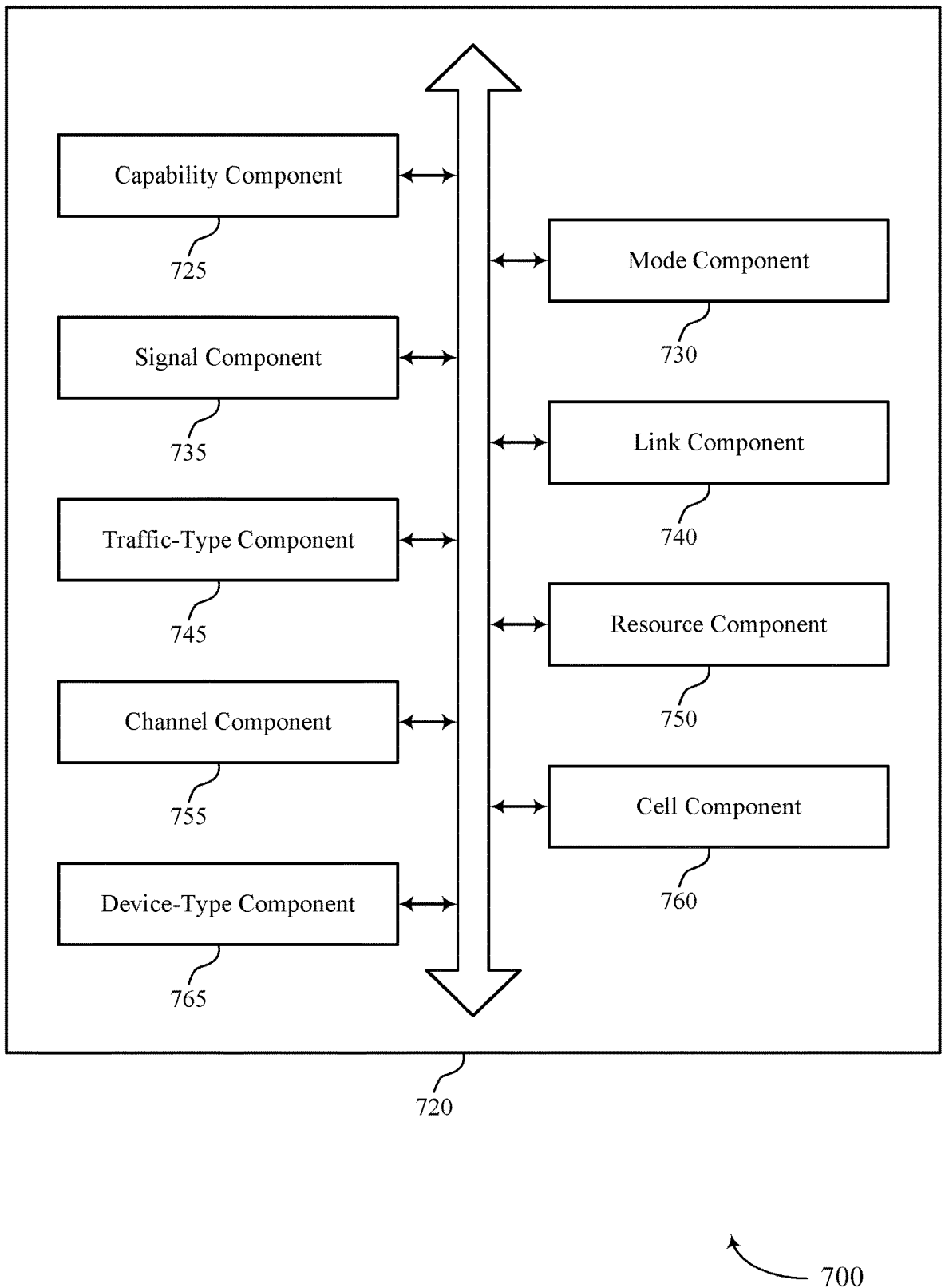
FIG. 7 shows a block diagram of a communications manager that supports IAB node to repeater conversion in accordance with aspects of the present disclosure.

FIG. 7 shows a block diagram 700 of a communications manager 720 that supports IAB node to repeater conversion in accordance with aspects of the present disclosure. The communications manager 720 may be an example of aspects of a communications manager 520, a communications manager 620, or both, as described herein. The communications manager 720, or various components thereof, may be an example of means for performing various aspects of IAB node to repeater conversion as described herein. For example, the communications manager 720 may include a capability component 725, a mode component 730, a signal component 735, a link component 740, a traffic-type component 745, a resource component 750, a channel component 755, a cell component 760, a device-type component 765, or any combination thereof. Each of these components may communicate, directly or indirectly, with one another (e.g., via one or more buses).

The communications manager 720 may support wireless communication at a first wireless device in accordance with examples as disclosed herein. The capability component 725 may be configured as or otherwise support a means for transmitting first control signaling indicating a capability of the first wireless device to operate in a set of multiple modes of operation, the set of multiple modes of operation including a first mode of operation associated with repeater operations and a first energy level and a second mode of operation associated with IAB operations and a second energy level higher than the first energy level. The mode component 730 may be configured as or otherwise support a means for receiving second control signaling indicating at least one mode of operation of the set of multiple modes of operation. The signal component 735 may be configured as or otherwise support a means for communicating one or more wireless signals according to the at least one mode of operation at the first wireless device.

In some examples, the one or more wireless signals includes backhaul traffic, and the signal component 735 may be configured as or otherwise support a means for communicating the backhaul traffic according to the at least one mode of operation. In some examples, to support communicating the one or more wireless signals, the signal component 735 may be configured as or otherwise support a means for receiving, from a second wireless device, the one or more wireless signals according to the at least one mode of operation. In some examples, to support communicating the one or more wireless signals, the signal component 735 may be configured as or otherwise support a means for transmitting, to a third wireless device, the one or more wireless signals according to the at least one mode of operation, where the one or more wireless signals includes backhaul traffic.

In some examples, the device-type component 765 may be configured as or otherwise support a means for determining a type of device associated with one or both of the second wireless device or the third wireless device, the type of device including a user equipment or an IAB node. In some examples, the mode component 730 may be configured as or otherwise support a means for selecting the at least one mode of operation of the set of multiple modes of operation based on the type of device associated with one or both of the second wireless device or the third wireless device. In some examples, the signal component 735 may be configured as or otherwise support a means for communicating the one or more wireless signals further based on selecting the at least one mode of operation.

In some examples, the link component 740 may be configured as or otherwise support a means for determining a communication link between the first wireless device and a second wireless device. In some examples, the mode component 730 may be configured as or otherwise support a means for selecting the at least one mode of operation of the set of multiple modes of operation based on the communication link between the first wireless device and a second wireless device. In some examples, the signal component 735 may be configured as or otherwise support a means for communicating the one or more wireless signals further based on selecting the at least one mode of operation.

In some examples, the traffic-type component 745 may be configured as or otherwise support a means for determining a type of traffic associated with the one or more wireless signals. In some examples, the mode component 730 may be configured as or otherwise support a means for selecting the at least one mode of operation of the set of multiple modes of operation based on the type of traffic associated with the one or more wireless signals. In some examples, the signal component 735 may be configured as or otherwise support a means for communicating the one or more wireless signals further based on selecting the at least one mode of operation.

In some examples, the first mode of operation is associated with a first resource type and the second mode of operation is associated with a second resource type different than the first resource type. In some examples, the resource component 750 may be configured as or otherwise support a means for determining a set of resources in one or both of a time domain or a frequency domain associated with the one or more wireless signals. In some examples, the mode component 730 may be configured as or otherwise support a means for selecting the at least one mode of operation of the set of multiple modes of operation based on the set of resources in one or both of the time domain or the frequency domain. In some examples, the signal component 735 may be configured as or otherwise support a means for communicating the one or more wireless signals further based on selecting the at least one mode of operation.

In some examples, the channel component 755 may be configured as or otherwise support a means for determining a channel associated with the one or more wireless signals, the channel including an uplink channel or a downlink channel. In some examples, the mode component 730 may be configured as or otherwise support a means for selecting the at least one mode of operation of the set of multiple modes of operation based on the channel associated with the one or more wireless signals. In some examples, the signal component 735 may be configured as or otherwise support a means for communicating the one or more wireless signals further based on selecting the at least one mode of operation. In some examples, the first mode of operation is associated with a first beam direction for communicating the one or more wireless signals and the second mode of operation is associated with a second beam direction for communicating the one or more wireless signals. In some examples, the first beam direction is different than the second beam direction.

In some examples, the mode component 730 may be configured as or otherwise support a means for selecting the at least one mode of operation of the set of multiple modes of operation based on timing information indicated by the second control signaling, the timing information identifying a periodic or aperiodic pattern. In some examples, the signal component 735 may be configured as or otherwise support a means for communicating the one or more wireless signals further based on selecting the at least one mode of operation. In some examples, the mode component 730 may be configured as or otherwise support a means for selecting the at least one mode of operation of the set of multiple modes of operation based on a condition indicated by the second control signaling, the condition including a connection establishment or a connection release. In some examples, the signal component 735 may be configured as or otherwise support a means for communicating the one or more wireless signals further based on selecting the at least one mode of operation.

In some examples, the cell component 760 may be configured as or otherwise support a means for determining a change to a cell identifier indicated by the second control signaling. In some examples, the mode component 730 may be configured as or otherwise support a means for selecting the at least one mode of operation of the set of multiple modes of operation based on the change to the cell identifier. In some examples, the signal component 735 may be configured as or otherwise support a means for communicating the one or more wireless signals further based on selecting the at least one mode of operation.

In some examples, the one or more wireless signals includes one or more SSBs, and the signal component 735 may be configured as or otherwise support a means for generating the one or more SSBs when operating in the first mode of operation associated with repeater operations and the first energy level. In some examples, the one or more wireless signals includes one or more SSBs, and the signal component 735 may be configured as or otherwise support a means for receiving, from a second wireless device, the one or more SSBs when operating in the second mode of operation associated with IAB operations and the second energy level. In some examples, the one or more wireless signals includes one or more SSBs, and the signal component 735 may be configured as or otherwise support a means for transmitting, to a third wireless device, the one or more SSBs when operating in the second mode of operation associated with IAB operations and the second energy level.

Additionally or alternatively, the communications manager 720 may support wireless communication at a first wireless device in accordance with examples as disclosed herein. In some examples, the capability component 725 may be configured as or otherwise support a means for receiving first control signaling indicating a capability of a second wireless device to operate in a set of multiple modes of operation, the set of multiple modes of operation including a first mode of operation associated with repeater operations and a first energy level and a second mode of operation associated with IAB operations and a second energy level higher than the first energy level. In some examples, the mode component 730 may be configured as or otherwise support a means for transmitting, to the second wireless device, second control signaling indicating at least one mode of operation of the set of multiple modes of operation. In some examples, the signal component 735 may be configured as or otherwise support a means for communicating one or more wireless signals according to the at least one mode of operation indicated by the second control signaling.

In some examples, the one or more wireless signals includes backhaul traffic, and the signal component 735 may be configured as or otherwise support a means for receiving the backhaul traffic according to the at least one mode of operation indicated by the second control signaling. In some examples, to support communicating the one or more wireless signals, the signal component 735 may be configured as or otherwise support a means for transmitting, to the second wireless device, the one or more wireless signals according to the at least one mode of operation indicated by the second control signaling.

In some examples, the at least one mode of operation indicated by the second control signaling is based on a communication link between the first wireless device and the second wireless device. In some examples, the at least one mode of operation indicated by the second control signaling is based on a type of traffic associated with the one or more wireless signals. In some examples, the first mode of operation is associated with a first resource type and the second mode of operation is associated with a second resource type different than the first resource type. In some examples, the at least one mode of operation indicated by the second control signaling is based on a set of resources in one or both of a time domain or a frequency domain associated with the one or more wireless signals.

In some examples, the at least one mode of operation indicated by the second control signaling is based on a channel associated with the one or more wireless signals, the channel including an uplink channel or a downlink channel. In some examples, the first mode of operation is associated with a first beam direction for communicating the one or more wireless signals and the second mode of operation is associated with a second beam direction for communicating the one or more wireless signals. In some examples, the first beam direction is different than the second beam direction.

In some examples, the at least one mode of operation indicated by the second control signaling is based on a condition. In some examples, the condition includes a connection establishment or a connection release. n some examples, the one or more wireless signals includes one or more SSBs, and the signal component 735 may be configured as or otherwise support a means for transmitting, to the second wireless device, the one or more SSBs according to the at least one mode of operation indicated by the second control signaling.

Figure 8:
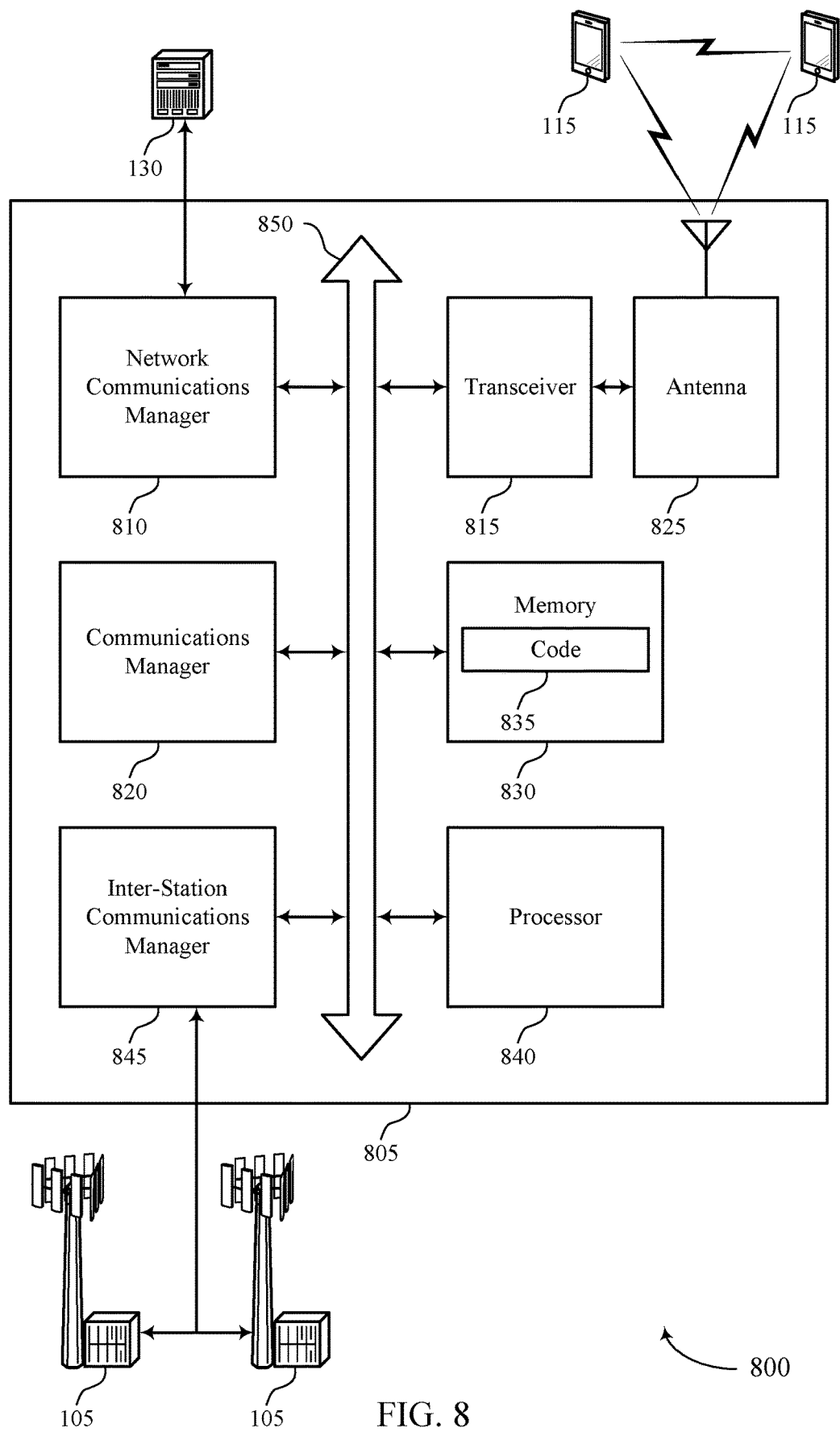
FIG. 8 shows a diagram of a system including a device that supports IAB node to repeater conversion in accordance with aspects of the present disclosure.

FIG. 8 shows a diagram of a system 800 including a device 805 that supports IAB node to repeater conversion in accordance with aspects of the present disclosure. The device 805 may be an example of or include the components of a device 505, a device 605, or network equipment (e.g., core network nodes, relay devices, IAB nodes, or other network equipment) as described herein. The device 805 may communicate wirelessly with one or more base stations 105, UEs 115, or any combination thereof. The device 805 may include components for bi-directional voice and data communications including components for transmitting and receiving communications, such as a communications manager 820, a network communications manager 810, a transceiver 815, an antenna 825, a memory 830, code 835, a processor 840, and an inter-station communications manager 845. These components may be in electronic communication or otherwise coupled (e.g., operatively, communicatively, functionally, electronically, electrically) via one or more buses (e.g., a bus 850).

The network communications manager 810 may manage communications with a core network 130 (e.g., via one or more wired backhaul links). For example, the network communications manager 810 may manage the transfer of data communications for client devices, such as one or more UEs 115.

In some cases, the device 805 may include a single antenna 825. However, in some other cases the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include RAM and ROM. The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a BIOS which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting IAB node to repeater conversion). For example, the device 805 or a component of the device 805 may include a processor 840 and memory 830 coupled to the processor 840, the processor 840 and memory 830 configured to perform various functions described herein.

The inter-station communications manager 845 may manage communications with other base stations 105, and may include a controller or scheduler for controlling communications with UEs 115 in cooperation with other base stations 105. For example, the inter-station communications manager 845 may coordinate scheduling for transmissions to UEs 115 for various interference mitigation techniques such as beamforming or joint transmission. In some examples, the inter-station communications manager 845 may provide an X2 interface within an LTE/LTE-A wireless communications network technology to provide communication between base stations 105.

The communications manager 820 may support wireless communication at a first wireless device (e.g., the device 805) in accordance with examples as disclosed herein. For example, the communications manager 820 may be configured as or otherwise support a means for transmitting first control signaling indicating a capability of the first wireless device to operate in a set of multiple modes of operation, the set of multiple modes of operation including a first mode of operation associated with repeater operations and a first energy level and a second mode of operation associated with IAB operations and a second energy level higher than the first energy level. The communications manager 820 may be configured as or otherwise support a means for receiving second control signaling indicating at least one mode of operation of the set of multiple modes of operation. The communications manager 820 may be configured as or otherwise support a means for communicating one or more wireless signals according to the at least one mode of operation at the first wireless device.

Additionally or alternatively, the communications manager 820 may support wireless communication at a first wireless device (e.g., the device 805) in accordance with examples as disclosed herein. For example, the communications manager 820 may be configured as or otherwise support a means for receiving first control signaling indicating a capability of a second wireless device to operate in a set of multiple modes of operation, the set of multiple modes of operation including a first mode of operation associated with repeater operations and a first energy level and a second mode of operation associated with IAB operations and a second energy level higher than the first energy level. The communications manager 820 may be configured as or otherwise support a means for transmitting, to the second wireless device, second control signaling indicating at least one mode of operation of the set of multiple modes of operation. The communications manager 820 may be configured as or otherwise support a means for communicating one or more wireless signals according to the at least one mode of operation indicated by the second control signaling.

By including or configuring the communications manager 820 in accordance with examples as described herein, the device 805 may support techniques for improved communication reliability, reduced latency, and reduced power consumption.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of IAB node to repeater conversion as described herein, or the processor 840 and the memory 830 may be otherwise configured to perform or support such operations.

Figure 9:
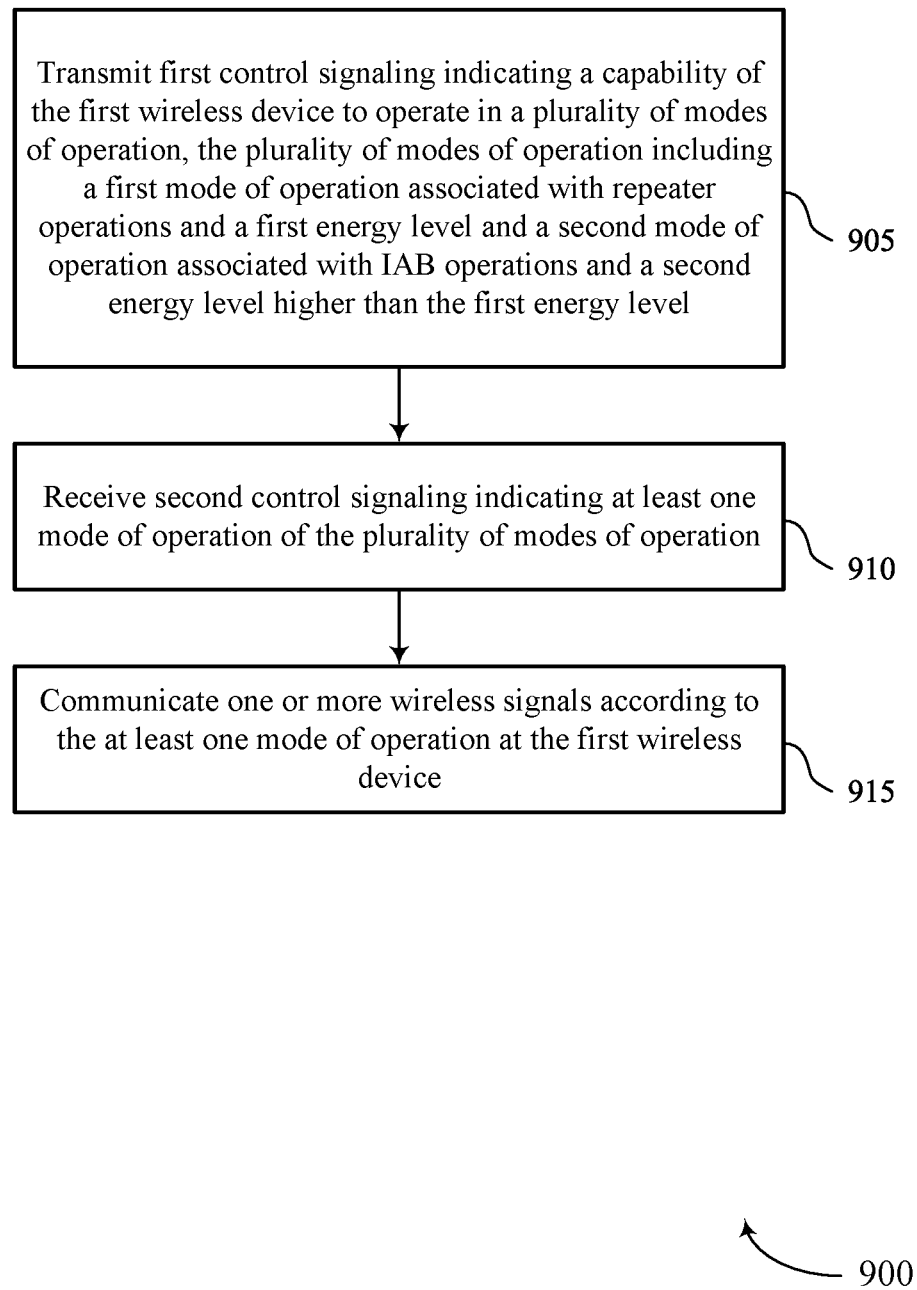
FIGS. 9 through 12 show flowcharts illustrating methods that support IAB node to repeater conversion in accordance with aspects of the present disclosure.

FIG. 9 shows a flowchart illustrating a method 900 that supports IAB node to repeater conversion in accordance with aspects of the present disclosure. The operations of the method 900 may be implemented by a device (e.g., network equipment, such as core network nodes, relay devices, IAB nodes, or other network equipment) or its components as described herein. For example, the operations of the method 900 may be performed by a device as described with reference to FIGS. 1 through 8. In some examples, a device may execute a set of instructions to control the functional elements of the device to perform the described functions. Additionally or alternatively, a device may perform aspects of the described functions using special-purpose hardware.

At 905, the method may include transmitting first control signaling indicating a capability of the first wireless device to operate in a set of multiple modes of operation, the set of multiple modes of operation including a first mode of operation associated with repeater operations and a first energy level and a second mode of operation associated with IAB operations and a second energy level higher than the first energy level. The operations of 905 may be performed in accordance with examples as disclosed herein. In some examples, aspects of the operations of 905 may be performed by a capability component 725 as described with reference to FIG. 7.

At 910, the method may include receiving second control signaling indicating at least one mode of operation of the set of multiple modes of operation. The operations of 910 may be performed in accordance with examples as disclosed herein. In some examples, aspects of the operations of 910 may be performed by a mode component 730 as described with reference to FIG. 7.

At 915, the method may include communicating one or more wireless signals according to the at least one mode of operation at the first wireless device. The operations of 915 may be performed in accordance with examples as disclosed herein. In some examples, aspects of the operations of 915 may be performed by a signal component 735 as described with reference to FIG. 7.

Figure 10:
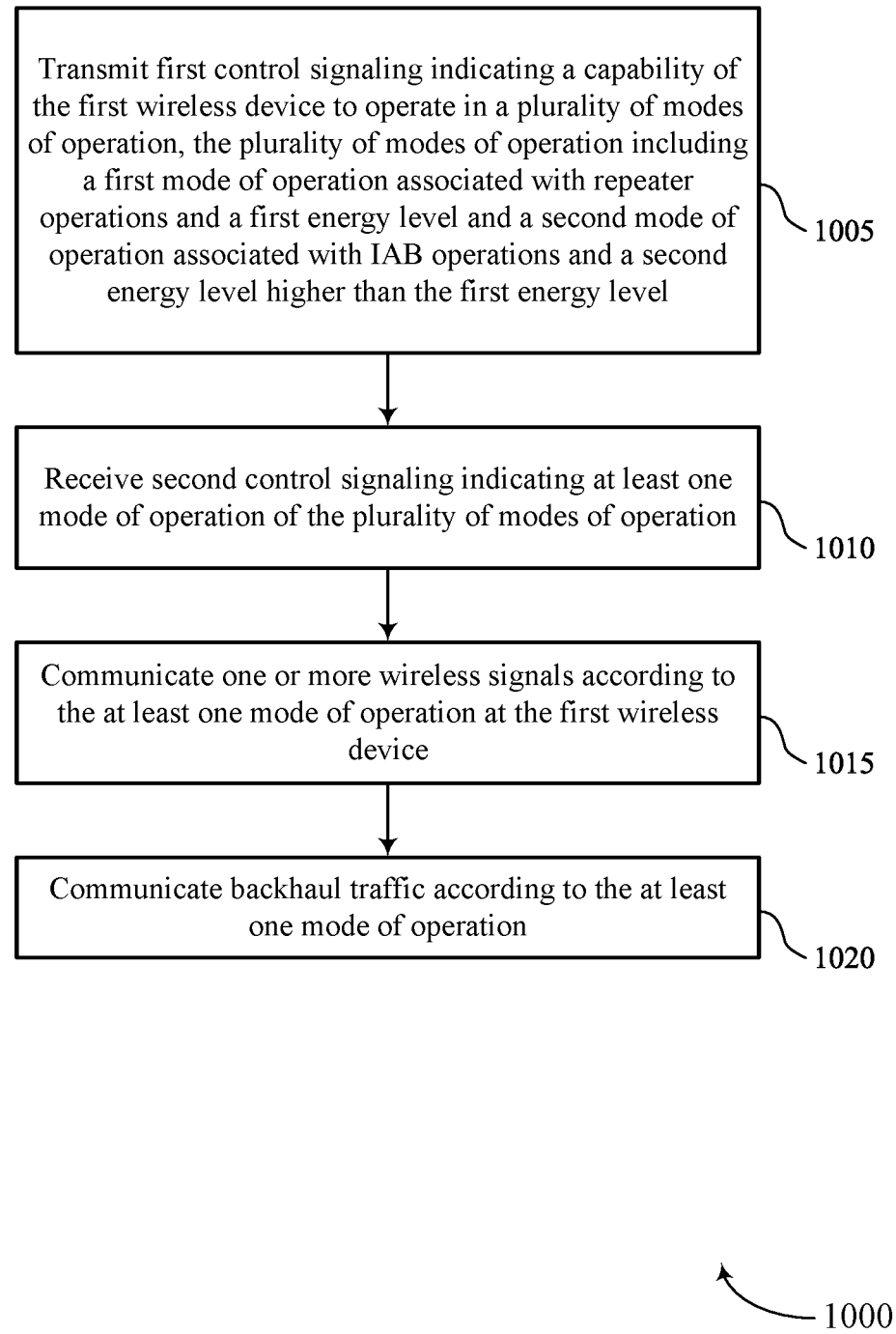

FIG. 10 shows a flowchart illustrating a method 1000 that supports IAB node to repeater conversion in accordance with aspects of the present disclosure. The operations of the method 1000 may be implemented by a device (e.g., network equipment, such as core network nodes, relay devices, IAB nodes, or other network equipment) or its components as described herein. For example, the operations of the method 1000 may be performed by a device as described with reference to FIGS. 1 through 8. In some examples, a device may execute a set of instructions to control the functional elements of the device to perform the described functions. Additionally or alternatively, a device may perform aspects of the described functions using special-purpose hardware.

At 1005, the method may include transmitting first control signaling indicating a capability of the first wireless device to operate in a set of multiple modes of operation, the set of multiple modes of operation including a first mode of operation associated with repeater operations and a first energy level and a second mode of operation associated with IAB operations and a second energy level higher than the first energy level. The operations of 1005 may be performed in accordance with examples as disclosed herein. In some examples, aspects of the operations of 1005 may be performed by a capability component 725 as described with reference to FIG. 7.

At 1010, the method may include receiving second control signaling indicating at least one mode of operation of the set of multiple modes of operation. The operations of 1010 may be performed in accordance with examples as disclosed herein. In some examples, aspects of the operations of 1010 may be performed by a mode component 730 as described with reference to FIG. 7.

At 1015, the method may include communicating one or more wireless signals according to the at least one mode of operation at the first wireless device. The operations of 1015 may be performed in accordance with examples as disclosed herein. In some examples, aspects of the operations of 1015 may be performed by a signal component 735 as described with reference to FIG. 7.

At 1020, the method may include communicating backhaul traffic according to the at least one mode of operation. The operations of 1020 may be performed in accordance with examples as disclosed herein. In some examples, aspects of the operations of 1020 may be performed by a signal component 735 as described with reference to FIG. 7.

Figure 11:
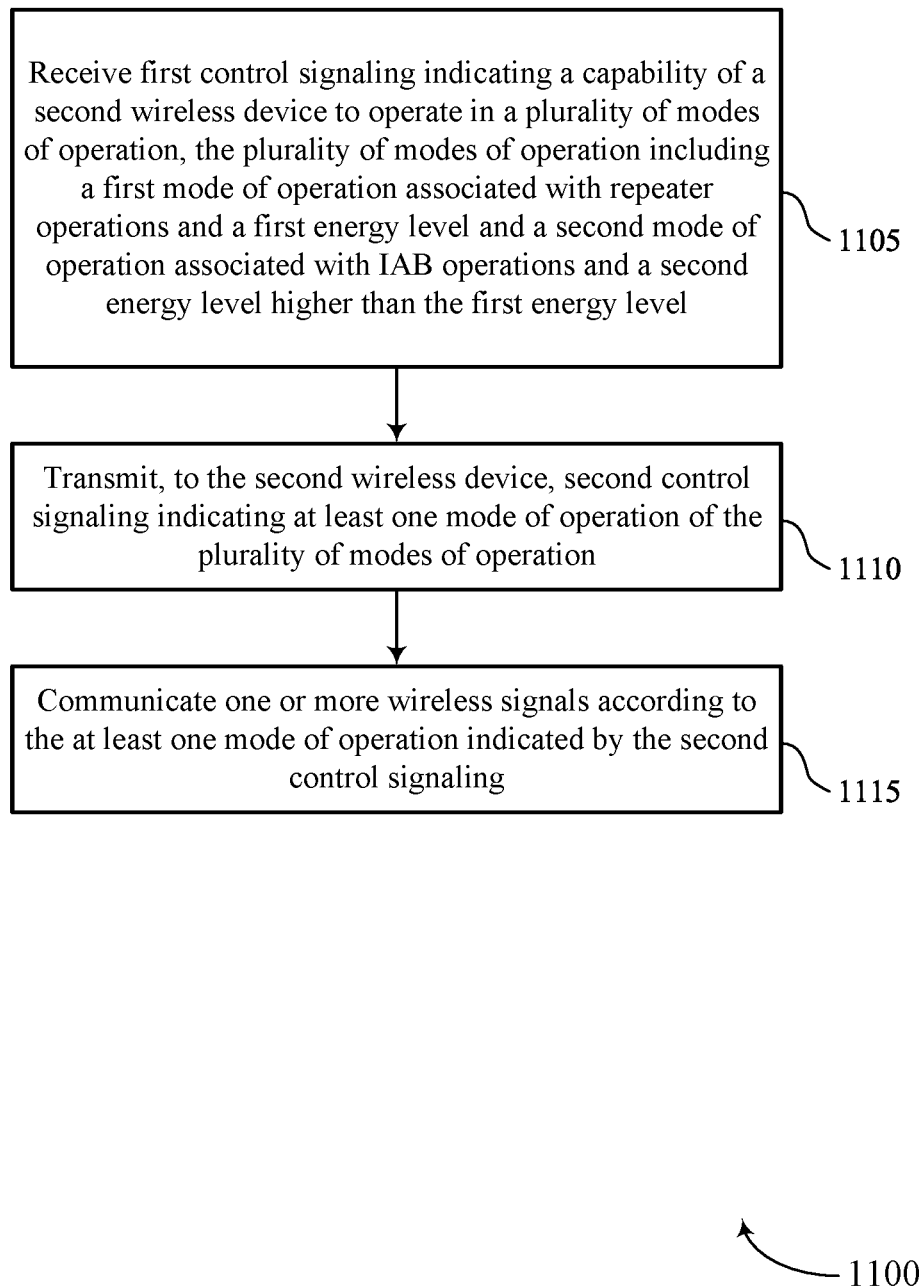

FIG. 11 shows a flowchart illustrating a method 1100 that supports IAB node to repeater conversion in accordance with aspects of the present disclosure. The operations of the method 1100 may be implemented by a device (e.g., network equipment, such as core network nodes, relay devices, IAB nodes, or other network equipment) or its components as described herein. For example, the operations of the method 1100 may be performed by a device as described with reference to FIGS. 1 through 8. In some examples, a device may execute a set of instructions to control the functional elements of the device to perform the described functions. Additionally or alternatively, a device may perform aspects of the described functions using special-purpose hardware.

At 1105, the method may include receiving first control signaling indicating a capability of a second wireless device to operate in a set of multiple modes of operation, the set of multiple modes of operation including a first mode of operation associated with repeater operations and a first energy level and a second mode of operation associated with IAB operations and a second energy level higher than the first energy level. The operations of 1105 may be performed in accordance with examples as disclosed herein. In some examples, aspects of the operations of 1105 may be performed by a capability component 725 as described with reference to FIG. 7.

At 1110, the method may include transmitting, to the second wireless device, second control signaling indicating at least one mode of operation of the set of multiple modes of operation. The operations of 1110 may be performed in accordance with examples as disclosed herein. In some examples, aspects of the operations of 1110 may be performed by a mode component 730 as described with reference to FIG. 7.

At 1115, the method may include communicating one or more wireless signals according to the at least one mode of operation indicated by the second control signaling. The operations of 1115 may be performed in accordance with examples as disclosed herein. In some examples, aspects of the operations of 1115 may be performed by a signal component 735 as described with reference to FIG. 7.

Figure 12:
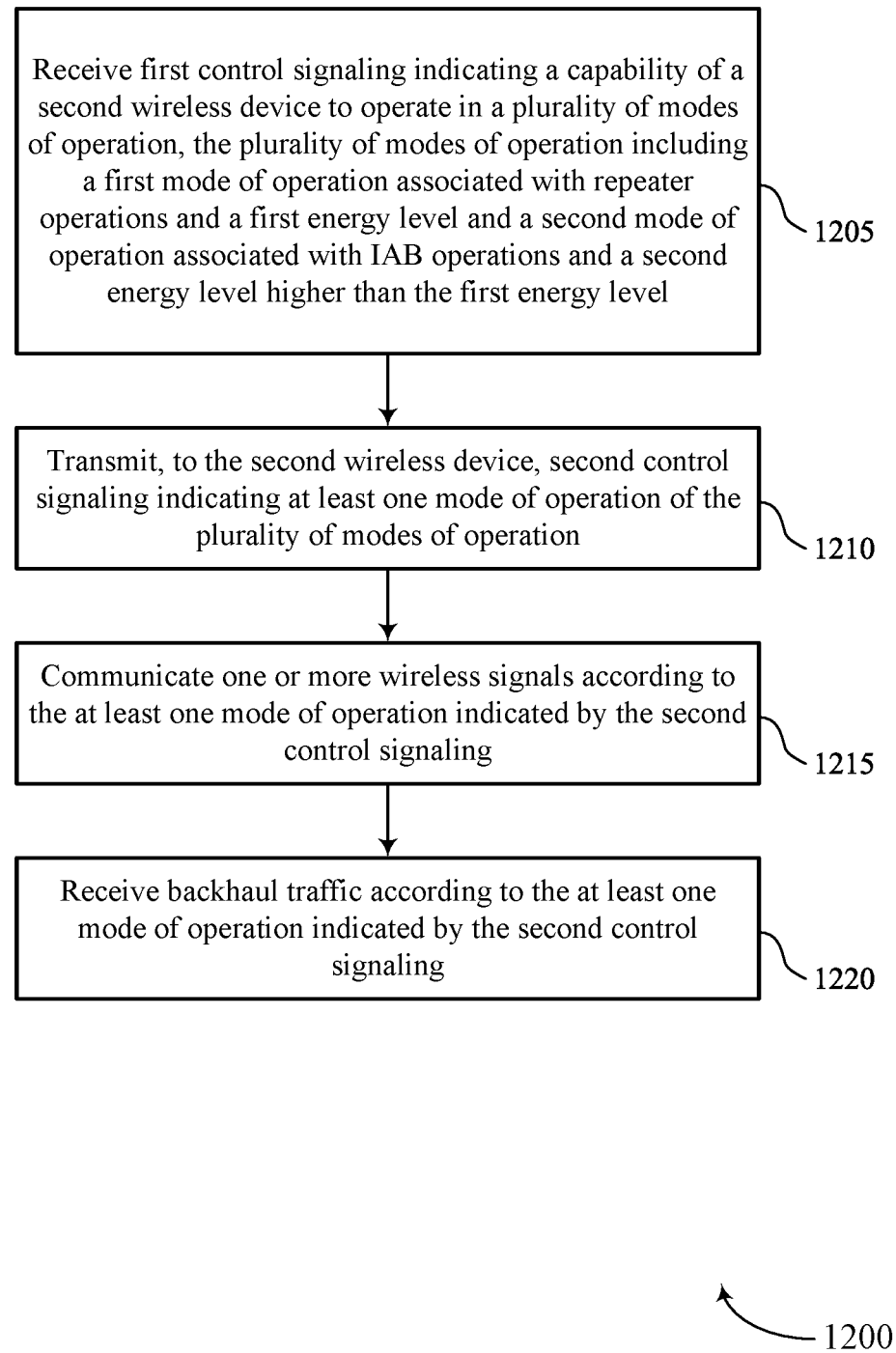

FIG. 12 shows a flowchart illustrating a method 1200 that supports IAB node to repeater conversion in accordance with aspects of the present disclosure. The operations of the method 1200 may be implemented by a device (e.g., network equipment, such as core network nodes, relay devices, IAB nodes, or other network equipment) or its components as described herein. For example, the operations of the method 1200 may be performed by a device as described with reference to FIGS. 1 through 8. In some examples, a device may execute a set of instructions to control the functional elements of the device to perform the described functions. Additionally or alternatively, a device may perform aspects of the described functions using special-purpose hardware.

At 1205, the method may include receiving first control signaling indicating a capability of a second wireless device to operate in a set of multiple modes of operation, the set of multiple modes of operation including a first mode of operation associated with repeater operations and a first energy level and a second mode of operation associated with IAB operations and a second energy level higher than the first energy level. The operations of 1205 may be performed in accordance with examples as disclosed herein. In some examples, aspects of the operations of 1205 may be performed by a capability component 725 as described with reference to FIG. 7.

At 1210, the method may include transmitting, to the second wireless device, second control signaling indicating at least one mode of operation of the set of multiple modes of operation. The operations of 1210 may be performed in accordance with examples as disclosed herein. In some examples, aspects of the operations of 1210 may be performed by a mode component 730 as described with reference to FIG. 7.

At 1215, the method may include communicating one or more wireless signals according to the at least one mode of operation indicated by the second control signaling. The operations of 1215 may be performed in accordance with examples as disclosed herein. In some examples, aspects of the operations of 1215 may be performed by a signal component 735 as described with reference to FIG. 7.

At 1220, the method may include receiving backhaul traffic according to the at least one mode of operation indicated by the second control signaling. The operations of 1220 may be performed in accordance with examples as disclosed herein. In some examples, aspects of the operations of 1220 may be performed by a signal component 735 as described with reference to FIG. 7.

The following provides an overview of aspects of the present disclosure:

Aspect 1: A method for wireless communication at a first wireless device, comprising: transmitting first control signaling indicating a capability of the first wireless device to operate in a plurality of modes of operation, the plurality of modes of operation including a first mode of operation associated with repeater operations and a first energy level and a second mode of operation associated with IAB operations and a second energy level higher than the first energy level; receiving second control signaling indicating at least one mode of operation of the plurality of modes of operation; and communicating one or more wireless signals according to the at least one mode of operation at the first wireless device.

Aspect 2: The method of aspect 1, wherein the one or more wireless signals comprises backhaul traffic, and the method further comprising: communicating the backhaul traffic according to the at least one mode of operation.

Aspect 3: The method of any of aspects 1 through 2, wherein communicating the one or more wireless signals comprises: receiving, from a second wireless device, the one or more wireless signals according to the at least one mode of operation; and transmitting, to a third wireless device, the one or more wireless signals according to the at least one mode of operation, wherein the one or more wireless signals comprises backhaul traffic.

Aspect 4: The method of aspect 3, further comprising: determining a type of device associated with one or both of the second wireless device or the third wireless device, the type of device comprising a user equipment or an IAB node; and selecting the at least one mode of operation of the plurality of modes of operation based at least in part on the type of device associated with one or both of the second wireless device or the third wireless device, wherein communicating the one or more wireless signals is further based at least in part on selecting the at least one mode of operation.

Aspect 5: The method of any of aspects 1 through 4, further comprising: determining a communication link between the first wireless device and a second wireless device; and selecting the at least one mode of operation of the plurality of modes of operation based at least in part on the communication link between the first wireless device and a second wireless device, wherein communicating the one or more wireless signals is further based at least in part on selecting the at least one mode of operation.

Aspect 6: The method of any of aspects 1 through 5, further comprising: determining a type of traffic associated with the one or more wireless signals; and selecting the at least one mode of operation of the plurality of modes of operation based at least in part on the type of traffic associated with the one or more wireless signals, wherein communicating the one or more wireless signals is further based at least in part on selecting the at least one mode of operation.

Aspect 7: The method of any of aspects 1 through 6, wherein the first mode of operation is associated with a first resource type and the second mode of operation is associated with a second resource type different than the first resource type.

Aspect 8: The method of any of aspects 1 through 7, further comprising: determining a set of resources in one or both of a time domain or a frequency domain associated with the one or more wireless signals; and selecting the at least one mode of operation of the plurality of modes of operation based at least in part on the set of resources in one or both of the time domain or the frequency domain, wherein communicating the one or more wireless signals is further based at least in part on selecting the at least one mode of operation.

Aspect 9: The method of any of aspects 1 through 8, further comprising: determining a channel associated with the one or more wireless signals, the channel comprising an uplink channel or a downlink channel; and selecting the at least one mode of operation of the plurality of modes of operation based at least in part on the channel associated with the one or more wireless signals, wherein communicating the one or more wireless signals is further based at least in part on selecting the at least one mode of operation.

Aspect 10: The method of any of aspects 1 through 9, wherein the first mode of operation is associated with a first beam direction for communicating the one or more wireless signals and the second mode of operation is associated with a second beam direction for communicating the one or more wireless signals, and the first beam direction is different than the second beam direction.

Aspect 11: The method of any of aspects 1 through 10, further comprising: selecting the at least one mode of operation of the plurality of modes of operation based at least in part on timing information indicated by the second control signaling, the timing information identifying a periodic or aperiodic pattern, wherein communicating the one or more wireless signals is further based at least in part on selecting the at least one mode of operation.

Aspect 12: The method of any of aspects 1 through 11, further comprising: selecting the at least one mode of operation of the plurality of modes of operation based at least in part on a condition indicated by the second control signaling, the condition comprising a connection establishment or a connection release, wherein communicating the one or more wireless signals is further based at least in part on selecting the at least one mode of operation.

Aspect 13: The method of any of aspects 1 through 12, further comprising: determining a change to a cell identifier indicated by the second control signaling; and selecting the at least one mode of operation of the plurality of modes of operation based at least in part on the change to the cell identifier, wherein communicating the one or more wireless signals is further based at least in part on selecting the at least one mode of operation.

Aspect 14: The method of any of aspects 1 through 13, wherein the one or more wireless signals comprises one or more SSBs, the method further comprising: generating the one or more SSBs when operating in the first mode of operation associated with repeater operations and the first energy level.

Aspect 15: The method of any of aspects 1 through 14, wherein the one or more wireless signals comprises one or more SSBs, the method further comprising: receiving, from a second wireless device, the one or more SSBs when operating in the second mode of operation associated with IAB operations and the second energy level; and transmitting, to a third wireless device, the one or more SSBs when operating in the second mode of operation associated with IAB operations and the second energy level.

Aspect 16: A method for wireless communication at a first wireless device, comprising: receiving first control signaling indicating a capability of a second wireless device to operate in a plurality of modes of operation, the plurality of modes of operation including a first mode of operation associated with repeater operations and a first energy level and a second mode of operation associated with IAB operations and a second energy level higher than the first energy level; transmitting, to the second wireless device, second control signaling indicating at least one mode of operation of the plurality of modes of operation; and communicating one or more wireless signals according to the at least one mode of operation indicated by the second control signaling.

Aspect 17: The method of aspect 16, wherein the one or more wireless signals comprises backhaul traffic, and the method further comprising: receiving the backhaul traffic according to the at least one mode of operation indicated by the second control signaling.

Aspect 18: The method of any of aspects 16 through 17, wherein communicating the one or more wireless signals comprises: transmitting, to the second wireless device, the one or more wireless signals according to the at least one mode of operation indicated by the second control signaling.

Aspect 19: The method of any of aspects 16 through 18, wherein the at least one mode of operation indicated by the second control signaling is based at least in part on a communication link between the first wireless device and the second wireless device.

Aspect 20: The method of any of aspects 16 through 19, wherein the at least one mode of operation indicated by the second control signaling is based at least in part on a type of traffic associated with the one or more wireless signals.

Aspect 21: The method of any of aspects 16 through 20, wherein the first mode of operation is associated with a first resource type and the second mode of operation is associated with a second resource type different than the first resource type.

Aspect 22: The method of any of aspects 16 through 21, wherein the at least one mode of operation indicated by the second control signaling is based at least in part on a set of resources in one or both of a time domain or a frequency domain associated with the one or more wireless signals.

Aspect 23: The method of any of aspects 16 through 22, wherein the at least one mode of operation indicated by the second control signaling is based at least in part on a channel associated with the one or more wireless signals, the channel comprising an uplink channel or a downlink channel.

Aspect 24: The method of any of aspects 16 through 23, wherein the first mode of operation is associated with a first beam direction for communicating the one or more wireless signals and the second mode of operation is associated with a second beam direction for communicating the one or more wireless signals, and the first beam direction is different than the second beam direction.

Aspect 25: The method of any of aspects 16 through 24, wherein the at least one mode of operation indicated by the second control signaling is based at least in part on a condition, and the condition comprises a connection establishment or a connection release.

Aspect 26: The method of any of aspects 16 through 25, wherein the one or more wireless signals comprises one or more SSBs, the method further comprising: transmitting, to the second wireless device, the one or more SSBs according to the at least one mode of operation indicated by the second control signaling.

Aspect 27: An apparatus for wireless communication at a first wireless device, comprising a processor; memory coupled with the processor; and instructions stored in the memory and executable by the processor to cause the apparatus to perform a method of any of aspects 1 through 15.

Aspect 28: An apparatus for wireless communication at a first wireless device, comprising at least one means for performing a method of any of aspects 1 through 15.

Aspect 29: A non-transitory computer-readable medium storing code for wireless communication at a first wireless device, the code comprising instructions executable by a processor to perform a method of any of aspects 1 through 15.

Aspect 30: An apparatus for wireless communication at a first wireless device, comprising a processor; memory coupled with the processor; and instructions stored in the memory and executable by the processor to cause the apparatus to perform a method of any of aspects 16 through 26.

Aspect 31: An apparatus for wireless communication at a first wireless device, comprising at least one means for performing a method of any of aspects 16 through 26.

Aspect 32: A non-transitory computer-readable medium storing code for wireless communication at a first wireless device, the code comprising instructions executable by a processor to perform a method of any of aspects 16 through 26.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communication at a first wireless device, comprising:
   one or more memories storing processor-executable code; and
   one or more processors coupled with the one or more memories and individually or collectively operable to execute the code to cause the first wireless device to:
   transmit first control signaling indicating a capability of the first wireless device to operate in a plurality of modes of operation, the plurality of modes of operation including a first mode of operation associated with repeater operations and a first energy level and a second mode of operation associated with integrated access and backhaul operations and a second energy level higher than the first energy level;

receive second control signaling indicating at least one mode of operation of the plurality of modes of operation; and communicate one or more wireless signals according to the at least one mode of operation at the first wireless device.

2. The apparatus of claim 1, wherein the one or more wireless signals comprises backhaul traffic, wherein the one or more processors are individually or collectively further operable to execute the code to cause the first wireless device:

communicate the backhaul traffic according to the at least one mode of operation.

3. The apparatus of claim 1, wherein, to communicate the one or more wireless signals, the one or more processors are individually or collectively operable to execute the code to cause the first wireless device to:

receive, from a second wireless device, the one or more wireless signals according to the at least one mode of operation; and transmit, to a third wireless device, the one or more wireless signals according to the at least one mode of operation, wherein the one or more wireless signals comprises backhaul traffic.

4. The apparatus of claim 3, wherein the one or more processors are individually or collectively further operable to execute the code to cause the first wireless device to:

determine a type of device associated with one or both of the second wireless device or the third wireless device, the type of device comprising a user equipment or an integrated access and backhaul node; and select the at least one mode of operation of the plurality of modes of operation based at least in part on the type of device associated with one or both of the second wireless device or the third wireless device, wherein to communicate the one or more wireless signals is further based at least in part on selecting the at least one mode of operation.

5. The apparatus of claim 1, wherein the one or more processors are individually or collectively further operable to execute the code to cause the first wireless device to:

determine a communication link between the first wireless device and a second wireless device; and select the at least one mode of operation of the plurality of modes of operation based at least in part on the communication link between the first wireless device and the second wireless device, wherein to communicate the one or more wireless signals is further based at least in part on selecting the at least one mode of operation.

6. The apparatus of claim 1, wherein the one or more processors are individually or collectively further operable to execute the code to cause the first wireless device to:

determine a type of traffic associated with the one or more wireless signals; and select the at least one mode of operation of the plurality of modes of operation based at least in part on the type of traffic associated with the one or more wireless signals, wherein to communicate the one or more wireless signals is further based at least in part on selecting the at least one mode of operation.

7. The apparatus of claim 1, wherein the first mode of operation is associated with a first resource type and the second mode of operation is associated with a second resource type different than the first resource type.

8. The apparatus of claim 1, wherein the one or more processors are individually or collectively further operable to execute the code to cause the first wireless device to:

determine a set of resources in one or both of a time domain or a frequency domain associated with the one or more wireless signals; and select the at least one mode of operation of the plurality of modes of operation based at least in part on the set of resources in one or both of the time domain or the frequency domain, wherein to communicate the one or more wireless signals is further based at least in part on selecting the at least one mode of operation.

9. The apparatus of claim 1, wherein the one or more processors are individually or collectively further operable to execute the code to cause the first wireless device to:

determine a channel associated with the one or more wireless signals, the channel comprising an uplink channel or a downlink channel; and select the at least one mode of operation of the plurality of modes of operation based at least in part on the channel associated with the one or more wireless signals, wherein to communicate the one or more wireless signals is further based at least in part on selecting the at least one mode of operation.

10. The apparatus of claim 1, wherein:

the first mode of operation is associated with a first beam direction for communicating the one or more wireless signals and the second mode of operation is associated with a second beam direction for communicating the one or more wireless signals, and the first beam direction is different than the second beam direction.

11. The apparatus of claim 1, wherein the one or more processors are individually or collectively further operable to execute the code to cause the first wireless device to:

select the at least one mode of operation of the plurality of modes of operation based at least in part on timing information indicated by the second control signaling, the timing information identifying a periodic or aperiodic pattern, wherein to communicate the one or more wireless signals is further based at least in part on selecting the at least one mode of operation.

12. The apparatus of claim 1, wherein the one or more processors are individually or collectively further operable to execute the code to cause the first wireless device to:

select the at least one mode of operation of the plurality of modes of operation based at least in part on a condition indicated by the second control signaling, the condition comprising a connection establishment or a connection release, wherein to communicate the one or more wireless signals is further based at least in part on selecting the at least one mode of operation.

13. The apparatus of claim 1, wherein the one or more processors are individually or collectively further operable to execute the code to cause the first wireless device to:

determine a change to a cell identifier indicated by the second control signaling; and select the at least one mode of operation of the plurality of modes of operation based at least in part on the change to the cell identifier, wherein to communicate the one or more wireless signals is further based at least in part on selecting the at least one mode of operation.

14. The apparatus of claim 1, wherein the one or more wireless signals comprises one or more synchronization signal blocks, and wherein the one or more processors are individually or collectively further operable to execute the code to cause the first wireless device to:

generate the one or more synchronization signal blocks when operating in the first mode of operation associated with repeater operations and the first energy level.

15. The apparatus of claim 1, wherein the one or more wireless signals comprises one or more synchronization signal blocks, and wherein the one or more processors are individually or collectively further operable to execute the code to cause the first wireless device to:
  receive, from a second wireless device, the one or more synchronization signal blocks when operating in the second mode of operation associated with integrated access and backhaul operations and the second energy level; and
  transmit, to a third wireless device, the one or more synchronization signal blocks when operating in the second mode of operation associated with integrated access and backhaul operations and the second energy level.

16. An apparatus for wireless communication at a first wireless device, comprising:
  one or more memories storing processor-executable code; and
  one or more processors coupled with the one or more memories and individually or collectively operable to execute the code to cause the first wireless device to:
  receive first control signaling indicating a capability of a second wireless device to operate in a plurality of modes of operation, the plurality of modes of operation including a first mode of operation associated with repeater operations and a first energy level and a second mode of operation associated with integrated access and backhaul operations and a second energy level higher than the first energy level;
  transmit, to the second wireless device, second control signaling indicating at least one mode of operation of the plurality of modes of operation;
  and communicate one or more wireless signals according to the at least one mode of operation indicated by the second control signaling.

17. The apparatus of claim 16, wherein the one or more wireless signals comprises backhaul traffic, and wherein the one or more processors are individually or collectively further operable to execute the code to cause the first wireless device to:
  receive the backhaul traffic according to the at least one mode of operation indicated by the second control signaling.

18. The apparatus of claim 16, wherein, to communicate the one or more wireless signals, the one or more processors are individually or collectively operable to execute the code to cause the first wireless device to:
  transmit, to the second wireless device, the one or more wireless signals according to the at least one mode of operation indicated by the second control signaling.

19. The apparatus of claim 16, wherein the at least one mode of operation indicated by the second control signaling is based at least in part on a communication link between the first wireless device and the second wireless device.

20. The apparatus of claim 16, wherein the at least one mode of operation indicated by the second control signaling is based at least in part on a type of traffic associated with the one or more wireless signals.

21. The apparatus of claim 16, wherein the first mode of operation is associated with a first resource type and the second mode of operation is associated with a second resource type different than the first resource type.

22. The apparatus of claim 16, wherein the at least one mode of operation indicated by the second control signaling is based at least in part on a set of resources in one or both of a time domain or a frequency domain associated with the one or more wireless signals.

23. The apparatus of claim 16, wherein the at least one mode of operation indicated by the second control signaling is based at least in part on a channel associated with the one or more wireless signals, the channel comprising an uplink channel or a downlink channel.

24. The apparatus of claim 16, wherein:
  the first mode of operation is associated with a first beam direction for communicating the one or more wireless signals and the second mode of operation is associated with a second beam direction for communicating the one or more wireless signals, and
  the first beam direction is different than the second beam direction.

25. The apparatus of claim 16, wherein:
  the at least one mode of operation indicated by the second control signaling is based at least in part on a condition, and
  the condition comprises a connection establishment or a connection release.

26. The apparatus of claim 16, wherein the one or more wireless signals comprises one or more synchronization signal blocks, and wherein the one or more processors are individually or collectively further operable to execute the code to cause the first wireless device to:
  transmit, to the second wireless device, the one or more synchronization signal blocks according to the at least one mode of operation indicated by the second control signaling.

27. A method for wireless communication at a first wireless device, comprising:
  transmitting first control signaling indicating a capability of the first wireless device to operate in a plurality of modes of operation, the plurality of modes of operation including a first mode of operation associated with repeater operations and a first energy level and a second mode of operation associated with integrated access and backhaul operations and a second energy level higher than the first energy level;
  receiving second control signaling indicating at least one mode of operation of the plurality of modes of operation; and
  communicating one or more wireless signals according to the at least one mode of operation at the first wireless device.

28. The method of claim 27, wherein the one or more wireless signals comprises backhaul traffic, the method further comprising:
  communicating the backhaul traffic according to the at least one mode of operation.

29. A method for wireless communication at a first wireless device, comprising:
  receiving first control signaling indicating a capability of a second wireless device to operate in a plurality of modes of operation, the plurality of modes of operation including a first mode of operation associated with repeater operations and a first energy level and a second mode of operation associated with integrated access and backhaul operations and a second energy level higher than the first energy level;
  transmitting, to the second wireless device, second control signaling indicating at least one mode of operation of the plurality of modes of operation; and communicating one or more wireless signals according to the at least one mode of operation indicated by the second control signaling.

30. The method of claim 29, wherein the one or more wireless signals comprises backhaul traffic, the method further comprising:
receiving the backhaul traffic according to the at least one mode of operation indicated by the second control signaling.

\* \* \* \* \*